US011555938B2

(12) United States Patent
Strand et al.

(10) Patent No.: US 11,555,938 B2
(45) Date of Patent: Jan. 17, 2023

(54) MARINE SURVEYING USING A SOURCE VESSEL

(71) Applicant: PGS Geophysical AS, Oslo (NO)

(72) Inventors: Christian Strand, Weybridge (GB); Edwin Thomas Hodges, Weybridge (GB)

(73) Assignee: PGS Geophysical AS, Oslo (NO)

( * ) Notice: Subject to any disclaimer, the term of this patent is extended or adjusted under 35 U.S.C. 154(b) by 257 days.

(21) Appl. No.: 16/716,847

(22) Filed: Dec. 17, 2019

(65) Prior Publication Data

US 2020/0200934 A1 Jun. 25, 2020

Related U.S. Application Data

(60) Provisional application No. 62/939,915, filed on Nov. 25, 2019, provisional application No. 62/782,150, filed on Dec. 19, 2018.

(51) Int. Cl.
*G01V 1/38* (2006.01)
*G01V 1/30* (2006.01)
*G01V 1/28* (2006.01)

(52) U.S. Cl.
CPC ............ *G01V 1/3835* (2013.01); *G01V 1/282* (2013.01); *G01V 1/30* (2013.01); *G01V 2210/671* (2013.01); *G01V 2210/675* (2013.01)

(58) Field of Classification Search
CPC ......... G01V 1/3835; G01V 1/282; G01V 1/30
See application file for complete search history.

(56) References Cited

U.S. PATENT DOCUMENTS

| | | | |
|---|---|---|---|
| 6,763,305 B2 | 7/2004 | Bernitsas | |
| 6,925,386 B2 | 8/2005 | Pramik et al. | |
| 7,554,880 B2 | 6/2009 | Fleming | |
| 7,689,396 B2 | 3/2010 | Campbell | |
| 8,559,265 B2 | 10/2013 | Moldoveanu et al. | |
| 9,075,161 B2 | 7/2015 | Cao et al. | |
| 9,733,374 B2 | 8/2017 | Svay et al. | |
| 9,903,966 B2 | 2/2018 | Hegna et al. | |
| 10,151,847 B2 | 12/2018 | Van Groenestijn | |
| 10,261,203 B2 * | 4/2019 | Oukili | G01V 1/302 |
| 10,359,526 B2 * | 7/2019 | Rønholt et al. | G01V 1/30 |

(Continued)

FOREIGN PATENT DOCUMENTS

EP 3088919 11/2016

OTHER PUBLICATIONS

International Search Report & Written Opinion for related PCT Application PCT/EP2019/086223, dated Apr. 2, 2020 (13 pgs).

(Continued)

*Primary Examiner* — Bryan Bui

(57) ABSTRACT

An actuation location for actuation of a first source coupled to a first marine survey vessel relative to a position of a second marine survey vessel towing a receiver to enhance illumination of a subsurface location can be determined based on a survey route of the second marine survey vessel and a priori data of the subsurface location. The first marine survey vessel can be navigated along a survey route of the first marine survey vessel to the actuation location during a marine survey by changing at least a cross-line position or an in-line position of the first marine survey vessel relative to the survey route of the second marine survey vessel.

18 Claims, 12 Drawing Sheets

(56) References Cited

U.S. PATENT DOCUMENTS

| | | | |
|---|---|---|---|
| 2006/0176774 A1* | 8/2006 | Toennessen | G01V 1/3861 |
| | | | 367/16 |
| 2009/0279386 A1 | 11/2009 | Monk | |
| 2014/0129188 A1 | 5/2014 | Schultz et al. | |
| 2014/0165694 A1 | 6/2014 | Bousquie et al. | |
| 2014/0200854 A1 | 7/2014 | Eggenberger et al. | |
| 2016/0238730 A1 | 8/2016 | Malling et al. | |
| 2016/0245941 A1 | 8/2016 | Rønholt et al. | |
| 2018/0100939 A1 | 4/2018 | Cocker et al. | |
| 2018/0120461 A1 | 5/2018 | Allegar et al. | |

OTHER PUBLICATIONS

Buia, et al., "Shooting seismic surveys in circles" Oilfield Review 20, No. 3, (2008) (14 pgs).

Zu, et al., "Iterative deblending of simultaneous-source data using a coherency-pass shaping operator" Geophysical Journal International 211, No. 1 (Aug. 2, 2017) (18 pgs).

Menzel-Jones, et al., "Uncovering the Missing Data in the Gas Cloud with P-P Wave Imaging: The First Deep-Water OBN Survey from Southeast Asia," SEG Technical Program Expanded Abstracts 2018, pp. 4136-4140 (SEG, Aug. 27, 2018).

\* cited by examiner

MARINE SURVEYING USING A SOURCE VESSEL

CROSS-REFERENCE TO RELATED APPLICATIONS

This application claims priority to U.S. Provisional Applications 62/782,150, filed Dec. 19, 2018 and 62/939,915, filed Nov. 25, 2019, which are incorporated by reference as if entirely set forth herein.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows a marine survey source (hereinafter referred to as "a source") below the sea surface and over a subterranean formation to be surveyed. Marine survey receivers (hereinafter referred to as "receivers") may be located on or near the seafloor, on a streamer towed by the marine survey vessel, or on a streamer towed by another vessel. The marine survey vessel typically contains marine survey equipment, such as navigation control, source control, receiver control, and recording equipment. The source control may cause the source, which can include an impulsive source such as an air gun, a non-impulsive source such as a marine vibrator source, an electromagnetic source, or combinations thereof, to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the sea surface. The receivers thereby measure a wavefield that was initiated by the actuation of the source.

DETAILED DESCRIPTION

Figure 1:
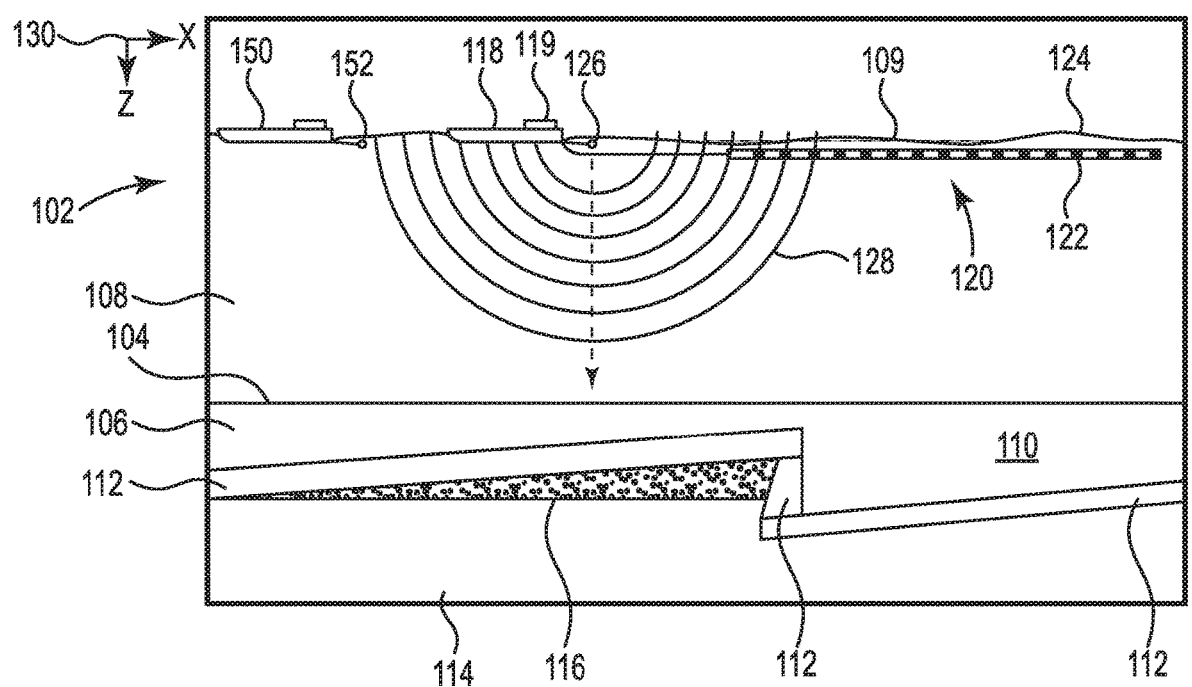
FIG. 1 illustrates an elevation or xz-plane view of marine surveying in which signals are emitted by a source for recording by receivers.

The present disclosure is related to marine surveying using a source vessel. As used herein, a "source vessel" refers to a marine survey vessel configured to tow a source that can supplement another source during a marine survey. Hereinafter, a source that supplements another source and is towed, or configured to be towed, by a source vessel, is referred to as a "secondary source" and the other source is referred to as a "primary source." As used herein, a "receiver vessel" refers to a marine survey vessel configured to tow a receiver. A receiver vessel can be configured to tow a receiver and a primary source; however, a different marine survey vessel, other than the receiver vessel, can be configured to tow the primary source. In at least one embodiment, the primary source can be stationary during at least a portion of a marine survey, rather than being towed during the marine survey. For example, a receiver vessel can move relative to the seafloor, and a primary source can be maintained at a position relative to the seafloor. The primary source can remain stationary at a set of global positioning system (GPS) coordinates. The primary source can be coupled to a source vessel that remains stationary during at least a portion of a marine survey. As described herein, a secondary source can be actuated for only a portion of a marine survey; for example, on an "as needed" basis.

A subsurface volume to be surveyed may include a subsurface obstruction. The subsurface obstruction may affect marine survey data of an underlying subsurface location. For example, a subsurface obstruction may cause a full or partial illumination shadow in marine survey data acquired from a marine survey of a subsurface location underlying the subsurface obstruction. A subsurface obstruction can be a three-dimensional body that has a different physical property than at least a portion of the surrounding subsurface volume (for example, the subsurface volume 102 described in association with FIG. 1). A subsurface obstruction may also be referred to as a heterogeneity. For example, the subsurface obstruction can have a different reflectivity, a different refractivity, a different velocity of sound therein, or combinations thereof than the surrounding subsurface volume. Acoustic energy from an actuation of a source may pass through a subsurface obstruction at a different velocity than a velocity at which the acoustic energy passed through the surrounding subsurface volume.

Some previous approaches for enhancing an illumination of a subsurface location may include a source vessel towing a secondary source in addition to a receiver vessel. As used herein, "illumination" refers to an amount of acoustic energy falling on and reflecting off a subsurface reflector and being received by a receiver. Enhancing an illumination of a subsurface location can include increasing an amount of acquired acoustic energy reflected off of the subsurface reflector at the subsurface location. Such enhancement can, for example, include increasing the amount of acoustic energy that falls on the subsurface reflector and is therefore available for reflection off of the subsurface reflector. Such enhancement can, for example, include increasing a percentage of the acoustic energy that falls on the subsurface reflector, reflects off of the subsurface reflector, and is received. The receiver vessel can be configured to tow a primary source or a different marine survey vessel can be configured to tow a primary source. The source vessels provide different (for example, increased) azimuths, offsets, or combinations thereof between a secondary source and a receiver towed by the receiver vessel as compared to azimuths and offsets between a primary source and the receiver. As used herein, "offset" refers to the distance between a source and a receiver.

In some previous approaches, respective relative positions of source vessels and a receiver vessel may not change as the receiver vessel navigates along a survey route. As used herein, "survey route" refers to a route of a marine survey vessel during a marine survey. For example, a source vessel may stay at a constant cross-line distance and a constant in-line distance from a receiver vessel. To maintain a fixed position relative to a receiver vessel, a source vessel may match a bottom speed and heading of the receiver vessel. Because, in previous approaches, the source vessels navigate at a fixed position relative to the receiver vessel, a secondary source may only be actuated at a fixed azimuth or offset. Although the fixed azimuth or offset may enhance an illumination of a subsurface location, the fixed azimuth or offset may not be optimum for an entire marine survey.

In contrast, at least one embodiment of the present disclosure includes a survey plan such that a source vessel does not maintain a fixed position relative to a receiver vessel. Rather, the source vessel can change a heading, a bottom speed, or combinations thereof regardless of a heading or speed of the receiver vessel. A marine survey can be defined by a survey plan. As used herein, a "survey plan" refers to parameters of a marine survey. Non-limiting examples of parameters of a survey plan include, a survey route, actuation locations, and a bottom speed of a marine survey vessel with which a marine survey is performed. As used herein, "actuation locations" refer to locations at which a source is planned to be actuated during a marine survey and "bottom speed" refers to the speed of a marine survey vessel relative to the seafloor.

Because the source vessel can change positions relative to the receiver vessel, a source coupled to the source vessel can be actuated at different relative locations, which are not constrained by the location of the receiver vessel, in order to enhance illumination of a subsurface location. For example, a secondary source coupled to the source vessel can be actuated at any position relative to the receiver vessel to enhance illumination of a subsurface location underlying a subsurface obstruction. A source vessel can navigate along a survey route that is independent of a survey route of a receiver vessel.

As described herein, a survey route of a source vessel can be updated to enhance illumination of a subsurface location. A survey plan can be generated prior to commencing a marine survey, hereinafter referred to as a pre-survey survey plan. In at least one embodiment of the present disclosure, a survey plan can be updated during a marine survey. For example, during a marine survey, a survey route of a source vessel can be updated from an initial state according to a pre-survey survey plan to enhance illumination of a subsurface location. A pre-survey survey plan can be based on a limited number of resources, such as sources, marine survey vessels, and receivers. A priori data upon which a pre-survey survey plan is based may not be precise enough to fully characterize subsurface obstructions in a subsurface volume to be surveyed. Non-limiting examples of a priori data of a subsurface location can include a velocity model and marine survey data acquired from a previous partial or full marine survey of the subsurface location. Performing a marine survey with a source vessel as described herein can improve a quality of marine survey data acquired from a marine survey without significantly increasing an amount of resources used to perform the marine survey.

As used herein, the singular forms "a," "an," and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected and, unless stated otherwise, can include a wireless connection.

The figures herein follow a numbering convention in which the first digit or digits correspond to the drawing figure number and the remaining digits identify an element or component in the drawing. Similar elements or components between different figures may be identified by the use of similar digits. For example, 150 may reference element "50" in FIG. 1, and a similar element may be referenced as 450 in FIGS. 4A-4B. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 illustrates an elevation or xz-plane 130 view of marine surveying in which signals are emitted by a primary source 126, such as a non-impulsive source, for recording by receivers 122. The recording can be used for processing and analysis in order to help characterize the structures and distributions of features and materials underlying the surface of the earth. For example, the recording can be used to estimate a physical property of a subsurface location, such as the presence of a reservoir that may contain hydrocarbons. FIG. 1 shows a domain volume 102 of the earth's surface comprising a subsurface volume 106 of sediment and rock below the surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, an underlying rock layer 114, and a hydrocarbon-saturated layer 116. One or more elements of the subsurface volume 106, such as the first sediment layer 110 and the uplifted rock layer 112, can be an overburden for the hydrocarbon-saturated layer 116. In some instances, the overburden may include salt.

FIG. 1 shows an example of a receiver vessel 118 and a source vessel 150 equipped to carry out marine surveys in accordance with the present disclosure. In particular, the receiver vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which receivers may be coupled. In one type of marine survey, each receiver, such as the receiver 122 represented by the shaded disk in FIG. 1, comprises a pair of sensors including a geophone that detects particle displacement within the water by detecting particle motion variation, such as velocities or accelerations, and/or a receiver that detects variations in pressure. In one type of marine survey, each receiver, such as the receiver 122, comprises an electromagnetic receiver that detects electromagnetic energy within the water. The streamers 120 and the receiver vessel 118 can include sensing electronics and data-processing facilities that allow receiver readings to be correlated with absolute positions on the sea surface and absolute three-dimensional positions with respect to a three-dimensional coordinate system. In FIG. 1, the receivers along the streamers 120 are shown to lie below the sea surface 109, with the receiver positions correlated with overlying surface positions, such as a surface position 124 correlated with the position of receiver 122.

The receiver vessel 118 can tow a primary source 126 that produces signals as the receiver vessel 118 and streamers 120 move across the sea surface 109. Although not specifically illustrated, the primary source 126 can include at least one source, such as a marine impulsive source, a marine non-impulsive source, or combinations thereof. The primary source 126 and/or streamers 120 may also be towed by other vessels or may be otherwise disposed in fluid volume 108. For example, the primary source 126 may also be disposed in a nearly-fixed or fixed configuration. For the sake of efficiency, illustrations and descriptions herein show receivers located on streamers, but it should be understood that references to receivers located on a "streamer" or "cable" should be read to refer equally to receivers located on a towed streamer, an ocean bottom receiver cable, and/or an array of nodes. Although illustrated as a point, the primary source 126 can represent a source string or a source array. The receiver vessel 118 can include a controller 119. For example, the controller 119 can be coupled to the primary source 126 to control actuation of the primary source 126. A position of the primary source 126 relative to the receiver vessel 118 can be adjusted in an in-line direction, a cross-line direction, or combinations thereof. As described herein, an illumination of a subsurface location can be enhanced by changing a fold, an azimuth, an offset between a source (for example, the primary source 126) and a receiver (for example, the receiver 122), or combinations thereof. Adjusting a position of the primary source 126 relative to the receiver vessel 118 can change a fold, an azimuth, an offset between the primary source 126 and the receiver 122, or combinations thereof. At least one embodiment can include adjusting a position of the primary source 126 relative to the receiver vessel 118 to further enhance illumination of a subsurface location.

FIG. 1 illustrates a source vessel 150 and a secondary source 152 coupled thereto. Although illustrated as a point, the secondary source 152 can represent a source string or a source array. For example, the secondary source 152 can include at least one source, such as a marine impulsive source, a marine non-impulsive source, or combinations thereof. Although not specifically illustrated, the source vessel 150 can include a controller. For example, the controller can be coupled to the secondary source 152 and configured to control actuation of the secondary source 152 as described herein. The controller can be configured to control a speed and heading of the source vessel 150. In at least one embodiment, the controller 119 onboard the receiver vessel 118 can be configured to control to control actuation of the secondary source 152. The controller 119 can be configured to control a speed and heading of the source vessel 150.

In at least one embodiment, the source vessel 150 can be an autonomous vessel. As used herein, "autonomous" modifying a noun refers to an ability of an object described by the noun to perform one or more actions with limited or no human interaction or decision making. As used herein, "autonomous" modifying a verb refers to performing an action described by the verb with limited or no human interaction or decision making. As described herein, the source vessel 150 can navigate along a survey route independent of a survey route of the receiver vessel 118. The source vessel 150 can change a cross-line distance, an in-line distance, or a combination thereof relative to the receiver vessel 118.

FIG. 1 shows acoustic energy illustrated as an expanding, spherical signal, illustrated as semicircles of increasing radius centered at the primary source 126, representing a down-going wavefield 128, following a signal emitted by the primary source 126. For ease of illustration and consideration with respect to the detail shown in FIG. 1, the down-going wavefield 128 may be considered as a combined output of a source array of primary sources. The down-going wavefield 128 is, in effect, shown in a vertical plane cross section in FIG. 1. The outward and downward expanding down-going wavefield 128 may eventually reach the surface 104, at which point the outward and downward expanding down-going wavefield 128 may partially scatter, may partially reflect back toward the streamers 120, and may partially refract downward into the subsurface volume 106, becoming elastic signals within the subsurface volume 106. Although not specifically illustrated, the secondary source 152 can emit acoustic energy as described in association with the primary source 126.

Figure 2:
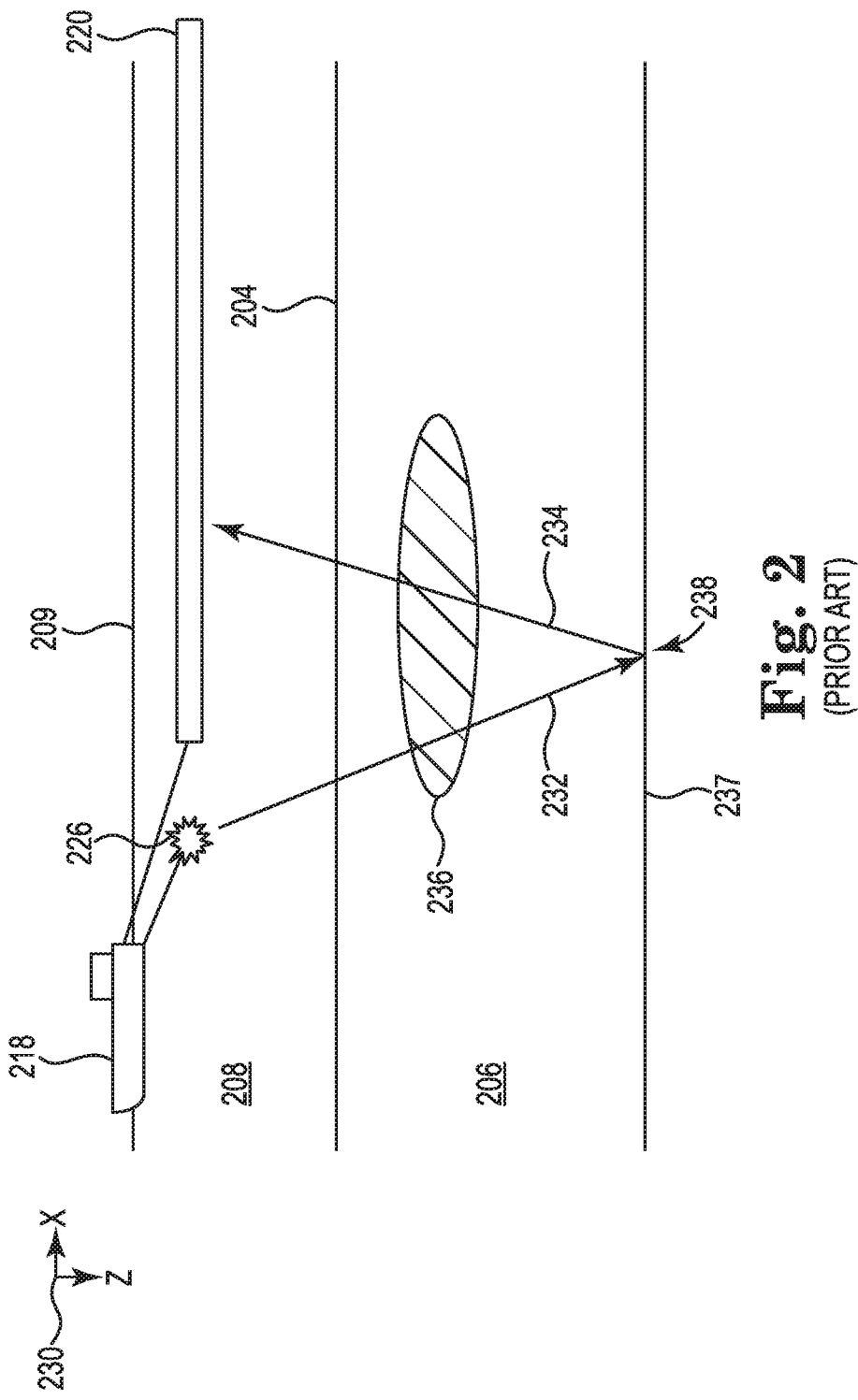
FIG. 2 illustrates an elevation or xz-plane view of a previous approach to marine surveying.

FIG. 2 illustrates an elevation or xz-plane 230 view of a previous approach to marine surveying. As illustrated by FIG. 2, the subsurface volume 206 includes a subsurface obstruction 236. Non-limiting examples of the subsurface obstruction 236 include a gas cloud or a salt body. The subsurface obstruction 236 may affect marine survey data acquired from a target subsurface location 238 on a subsurface reflector 237 underlying the subsurface obstruction 236. Although FIG. 2 identifies the target subsurface location 238 as the point where acoustic energy from an actuation of the primary source 226 reflects off the subsurface reflector 237, the target subsurface location 238 is not limited to an infinitesimal point on the subsurface reflector 237. Rather, the target subsurface location 238 may refer to a two-dimensional subsurface area or a three-dimensional subsurface volume that is a target of a marine survey. The target subsurface location 238 may be partially or completely obstructed by (partially or completely underlying) the subsurface obstruction 236. It should be noted that at least one embodiment of the present disclosure described herein can be used to enhance illumination of a target subsurface location (such as the target subsurface location 238) even if the target subsurface location is wholly unobstructed.

As an example, when a marine survey traverses the subsurface obstruction 236 such that a primary source 226 and a streamer 220 are located below a sea surface 209 and above the subsurface obstruction, the acoustic energy from the actuation of the primary source 226 to the target subsurface location 238 may pass through a fluid volume 208, a surface 204, the subsurface volume 206, and the subsurface obstruction 236 as represented by a ray path 232. Some of the acoustic energy from the actuation of the primary source 226 may reflect off the subsurface obstruction 236 or refract within the subsurface obstruction 236 on the way to the target subsurface location 238. Upon reaching the target subsurface location 238, some of the acoustic energy from the actuation of the primary source 226 may reflect off the target subsurface location 238 and pass through the subsurface volume 206, the subsurface obstruction 236, the surface 204, and the fluid volume 208 to the streamer 220 as represented by a ray path 234. Some of the acoustic energy from the reflection off of the subsurface reflector 237 at the target subsurface location 238 may reflect off the subsurface obstruction 236 or refract within the subsurface obstruction 236 on the way to the streamer 220.

To enhance illumination of the target subsurface location 238, a fold, an azimuth, or an offset between a source and the streamer 220, or combinations thereof, can be changed. As used herein, "fold" refers to a number of times there are contributions to an illumination of a subsurface location from a source and receiver combination. An additional source coupled to an additional marine survey vessel (a source vessel) can be used to increase a fold, an azimuth, or an offset. A fold, an azimuth, or an offset between the secondary source and the streamers 220 may be greater or less than a fold, an azimuth, or an offset between the primary source 226 and the streamers 220. In some previous approaches, a source vessel is kept in lockstep with a receiver vessel 218 at a fixed position relative to the receiver vessel 218 so that fold, azimuths, and offsets are limited to a fixed value throughout a marine survey.

In contrast, at least one embodiment of the present disclose is not so limited because a source vessel towing a source is not kept in lockstep with a receiver vessel 218 at a fixed position relative to the receiver vessel 218. The position of the source vessel relative to the receiver vessel 218 can change during a marine survey. Therefore, a source coupled to the source vessel can be actuated at locations that further enhance illumination of the target subsurface location 238 that cannot not be achieved by previous approaches.

In at least one embodiment of the present disclosure, a subsurface location along a survey route of a receiver vessel having an illumination below a threshold can be determined. As used herein, "threshold" with respect an illumination refers to a threshold amount of acoustic energy falling on and reflecting off a subsurface reflector and being received by a receiver. An illumination of a subsurface location can be determined by raytracing, a wave equation, a full waveform model, or combinations thereof. A subsurface location may have an illumination below a threshold because the subsurface location underlies a subsurface obstruction, for example. The threshold can be based on a desired illumination. For example, a higher threshold can be used for a portion of a marine survey in which higher quality marine survey data is desired and a lower threshold can be used for a different portion of the marine survey. The threshold can be set to be indicative of subsurface locations that may underlie or be near a subsurface obstruction.

Because a survey plan can include a survey route of a receiver vessel, locations of receivers as the receivers are towed by the receiver vessel along the survey route of the receiver vessel can be known. Known locations of the receivers can be used to determine actuation locations of a secondary source to enhance illumination of a subsurface location. For example, actuation locations for a secondary source coupled to a source vessel can be determined to enhance the illumination of the subsurface locations determined to have illuminations below the threshold. In at least one embodiment, raytracing can be performed upwards from a reflection point at a subsurface location (for example, a target subsurface location on a subsurface reflector) to a location of a receiver. An actuation location corresponding to the reflection point can be determined. In at least one embodiment, raytracing can be performed from a possible actuation location to a subsurface location (for example, a target subsurface location on a subsurface reflector) to a location of a receiver. In at least one embodiment, respective target subsurface locations on more than one subsurface reflector can be used. For example, raytracing can be performed upwards from respective target subsurface locations on more than one subsurface reflector to a location of a receiver. Raytracing can be performed from a possible actuation location to respective target subsurface locations on more than one subsurface reflector to a location of a receiver.

Figure 3:
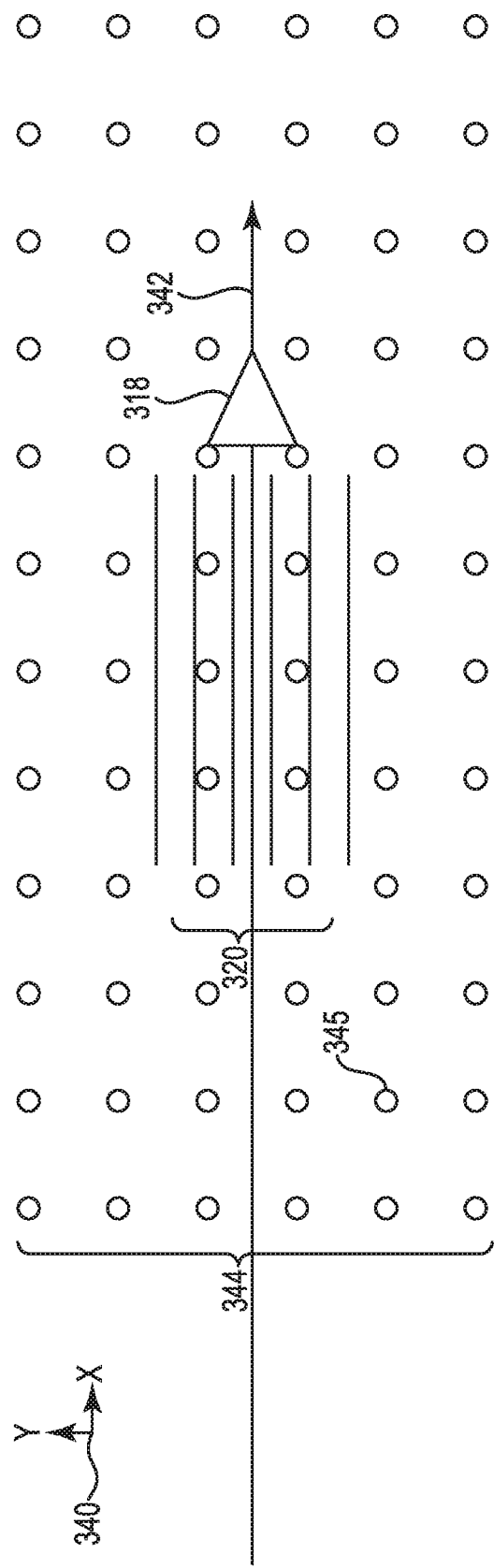
FIG. 3 illustrates a plan or xy-plane view of possible actuation locations along a survey route of a receiver vessel.

FIG. 3 illustrates a plan or xy-plane 340 view of possible actuation locations 344 along a survey route 342 of a receiver vessel 318. The survey route 342 can be in a racetrack configuration or a portion of a sparse grid, for example. The survey route 342 and a bottom speed of the receiver vessel 318 along the survey route 342 can be known. As used herein, a "possible actuation location" is a location at which a secondary source coupled to a source vessel may be actuated during a marine survey. The possible actuation locations 344 can be along at least a portion of the survey route 342. The possible actuation locations 344 can be along at least a portion of the survey route 342 that is near or traverses a subsurface obstruction. Embodiments of the present disclosure are not limited to the positioning, spacing, or quantity of the possible actuation locations 344 illustrated in FIG. 3. For example, thousands of possible actuations along a survey route of a receiver vessel can be considered. Non-limiting examples of spacing between the possible actuation locations 344 can include approximately 12.5 meters to approximately twenty-five meters.

In at least one embodiment, a priori data of a subsurface can be used to determine if the survey route 342 is near or traverses a subsurface obstruction. In at least one embodiment, during a marine survey, a priori data of a subsurface location can be supplemented with marine survey data acquired from the marine survey. Marine survey data acquired from a partially completed marine survey can be used to reinterpret the geology of a subsurface location. For example, a velocity model corresponding to a subsurface location can be updated using marine survey data acquired from a partially completed marine survey.

An illumination of a subsurface location for one of the possible actuation locations 344, for example, the possible actuation location 345, and a location of a receiver on the streamers 320 can be determined. A priori data of a subsurface location can be used to determine an illumination of a subsurface location. For example, raytracing can be performed from the possible actuation location 345 down to the subsurface location and up from the subsurface location to a location of a receiver of the streamers 320. In at least one embodiment, the actuation location 345 and a location of a receiver of the streamers 320 can be migrated from full waveform modeled data. Migrating events from one of the possible actuation locations to a receiver can include calculating an amplitude response of a subsurface location. An amplitude response can be calculated from a range of the possible actuation locations 344, a range of receiver positions, or combinations thereof. Results from migrating events can be sorted by which a pair of a possible actuation location and a receiver position provides the greatest migrated amplitude. An actuation location of a pair of a possible actuation location and a receiver position that provides the greatest migrated amplitude can be included in a survey route of a source vessel. Although raytracing can determine illuminations of a subsurface location computationally faster than migrating, raytracing may include more assumptions about the results than migrating. Migrating can be more accurate than raytracing because migrating includes fewer assumptions about the results than raytracing. However, migrating can be computationally slower than raytracing.

The determined illuminations for the possible actuation locations 344 can be compared to the threshold. Because an actuation location of a secondary source included in a survey plan is not constrained by a position of the receiver vessel 318 along the survey route 342, any of the possible actuation locations 344 determined to provide an illumination that is at least the threshold, exceeds the threshold, or exceeds the threshold by a minimum amount can be included in the survey plan. The survey plan can include a survey route of a source vessel towing a secondary source that navigates the source vessel to those actuation locations. Any of the possible actuation locations 344 determined to provide an illumination that is below the threshold can be excluded from a survey route of a source vessel of a marine survey. Although the possible actuation locations 344 are illustrated as a two-dimensional grid, embodiments are not so limited.

An illumination of a subsurface location for any of the possible actuation locations 344 can be determined, as described herein, iteratively for locations of a receiver on the streamers 320 along the survey route. For each iteration, the determined illumination can be compared to the threshold. For example, the actuation location 345 may provide a better illumination of a subsurface location when a receiver of the streamers 320 is at a first location along the survey route 342 than when the receiver of the streamers 320 is at a second location along the survey route 342. Thus, a survey plan can include actuating a source coupled to a source vessel when the receiver is at the first location as opposed to when the receiver is at the second location.

In at least one embodiment, for an actuation location of a primary source (not shown in FIG. 3), an illumination for at least one of the possible actuation locations 344 (for example, the possible actuation location 345) for a secondary source can be determined as described herein. The determined illumination can be analyzed to determine whether an actuation of a secondary source at the possible actuation location 345 enhances illumination of a subsurface. In at least one embodiment, for each actuation location of a primary, an illumination for at least one of the possible actuation locations 344 for a secondary source can be iteratively determined as described herein. During each iteration, the determined illumination can be analyzed to determine whether an actuation of a secondary source at the at least one possible actuation location enhances illumination of a subsurface. A survey route of a source vessel can be determined that passes through those of the possible actuation locations 344 at which an actuation of a secondary source enhances illumination of a subsurface.

Figure 4B:
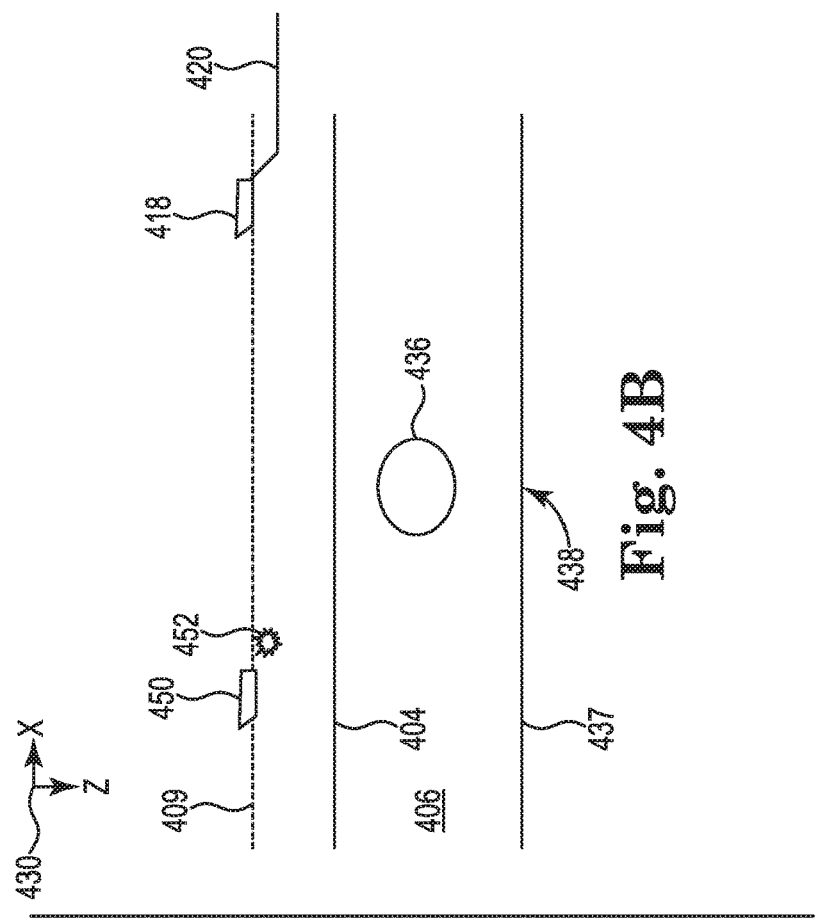
FIG. 4B illustrates an elevation or xz-plane view of marine surveying using a source vessel.
Figure 4A:
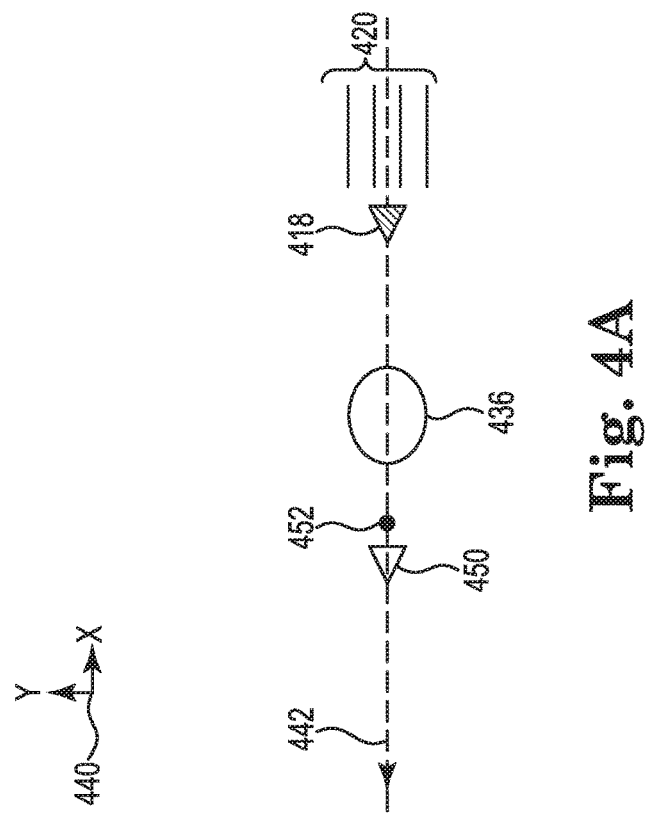
FIG. 4A illustrates a plan or xy-plane view of marine surveying using a source vessel.

FIG. 4A illustrates a plan or xy-plane 440 view of marine surveying using a source vessel 450. FIG. 4B illustrates an elevation or xz-plane 430 view of marine surveying using the source vessel 450. FIGS. 4A-4B illustrate a receiver vessel 418 towing streamers 420 along a survey route 442 on or near a sea surface 409. Note that the survey route (not shown) of the source vessel 450 can be different than the survey route 442 of the receiver vessel 418. The survey route 442 traverses a subsurface obstruction 436 in a subsurface volume 406 (below a surface 404). A target subsurface location 438 on a subsurface reflector 437 underlies the subsurface obstruction 436. Although FIG. 4B shows a target subsurface location on a single subsurface obstruction, a marine survey plan can include respective target subsurface locations on more than one subsurface reflector. Determined illuminations for possible actuation locations (for example, the possible actuation locations 344) can be based on a quantity of reflections off each respective subsurface reflector.

Although not specifically illustrated by FIGS. 4A-4B, at least the receiver vessel 418 or a marine survey vessel other than the receiver vessel 418 or the source vessel 450 can tow a primary source (for example, the primary source 126 described in association with FIG. 1). The source vessel 450 tows a secondary source 452 that is a source in addition to the primary source. The secondary source 452 can be actuated during a marine survey on an "as needed" basis.

FIGS. 4A-4B illustrate the source vessel 450 navigating ahead of the receiver vessel 418. However, the source vessel 450 can change its in-line position, cross-line position, or combinations thereof relative to the receiver vessel 418 as the receiver vessel 418 navigates along the survey route 442. As a result, the source vessel 450 can navigate to actuation locations regardless of a location of the receiver vessel 418 along the survey route 442 of the source vessel 450. The source vessel 450 can be configured to change a position and a bottom speed of the source vessel 450 relative to a position and a bottom speed of the receiver vessel 418 according to the survey plan. As described herein in association with FIG. 5, a survey plan can include the source vessel 450 navigating at different bottom speeds along different portions of a survey route in order to actuate the secondary source 452 at actuation locations on the survey route.

As described herein, a survey plan can include a discontinuous survey route of a source vessel. A survey route of a receiver vessel can be continuous. For example, the survey route 442 of the receiver vessel 418 can begin with the commencement of a marine survey and end upon completion of the marine survey. On the other hand, however, a survey route of a source vessel can begin after commencement of the marine survey, end prior to completion of a marine survey, or combinations thereof. For example, if the source vessel 450 is activated from a standby mode subsequent to the commencement of a marine survey, the survey route of the source vessel 450 can begin from the location at which the source vessel 450 is activated from the standby mode.

The source vessel 450 can be in a standby mode during a portion of a marine survey. For example, the source vessel can be in a standby mode at commencement of a marine survey, at completion of a marine survey, intermittently during a marine survey, or combinations thereof. When in a standby mode, the source vessel 450 can be in motion so as to maintain a fixed position relative to the receiver vessel 418. When in a standby mode, the source vessel 450 can be stationary so as to maintain a fixed location. For example, the source vessel 450 can maintain a position near the survey route 442 of the receiver vessel 418 until activated from the standby mode. In response to activation of the source vessel 450 from a standby mode, the source vessel 450 can navigate along a survey route to an actuation location. The secondary source 452 coupled to the source vessel 450 may not be actuated when the source vessel 450 is in a standby mode. The source vessel 450 can be activated from a standby mode to enhance illumination of a subsurface location.

As illustrated by the example of FIGS. 4A-4B, at least a portion of the survey route 442 of the receiver vessel 418 traverses the subsurface obstruction 436. The source vessel 450 can be activated from a standby mode in response to the receiver vessel 418 approaching the subsurface obstruction 436. Information about the subsurface obstruction 436 (for example, a location of the subsurface obstruction 436 within the subsurface volume 406) may be known prior to a marine survey of the subsurface volume 406 from a priori data of the subsurface volume 406. In at least one embodiment, at least one actuation location for actuation of the secondary source 452 that enhances illumination of the subsurface location can be determined as described herein. A survey plan of a marine survey yet to be performed can include a survey route of the source vessel 450 planned to pass through the at least one actuation location so that the secondary source 452 can be actuated at the at least one actuation location to enhance illumination of the target subsurface location 438. The source vessel 450 can be activated (on an as needed basis, for example) from a standby mode and deactivated to a standby mode in a pre-planned manner according to the survey plan. In response to deactivation of the source vessel 450 to a standby mode, the source vessel 450 can navigate to a position near the survey route 442 and remain stationary at that position or move at a reduced bottom speed until activated from the standby mode or the marine survey is completed. In response to deactivation of the source vessel 450 to a standby mode, the source vessel 450 can maintain a position relative to the receiver vessel 418 until activated from the standby mode or the marine survey is completed. For example, when in a standby mode, the source vessel 450 can maintain a position one kilometer off the starboard side of the receiver vessel 418.

In an exemplary embodiment, a survey plan can include a first portion of a survey route of the source vessel 450, during which the source vessel 450 is in a standby mode. The survey plan can include a second portion of the survey route of the source vessel 450 can include the source vessel 450 being activated from the standby mode. The receiver vessel 418 can traverse the subsurface obstruction 436 along the survey route 442 concurrently with the source vessel 450 navigating along the second portion of the survey route of the source vessel 450. During the second portion of the survey route of the source vessel 450, the source vessel 450 can navigate to an actuation location determined to enhance illumination of the target subsurface location 438. A third portion of the survey route of the source vessel 450 can include the source vessel 450 being deactivated to the standby mode. The receiver vessel 418 can navigate away from the subsurface obstruction 436 along the survey route 442 concurrently with the source vessel 450 navigating along the third portion of the survey route of the source vessel 450. Thus, the source vessel 450, and the secondary source 452, are called into service as needed.

In at least one embodiment of the present disclosure, the source vessel 450 can be an autonomous vessel. An autonomous source vessel can be configured to autonomously navigate along the survey route of the autonomous source vessel and autonomously actuate a secondary source at an actuation location along the survey route of the autonomous source vessel. An autonomous source vessel can be configured to deactivate to a standby mode, activate from a standby mode, or combinations thereof at pre-planned locations according to a survey plan. An autonomous source vessel can be configured to deactivate to a standby mode, activate from a standby mode, or combinations thereof in response to worsening or poor illumination of a subsurface location as described herein.

During a marine survey, acquired marine survey data can indicate worsening or poor illumination of a subsurface location (for example, the target subsurface location 438). Poor illumination means illumination less than a desired threshold illumination. The poor illumination can be because of the subsurface obstruction 436 or some other cause. In some previous approaches where marine survey data acquired from a first marine survey indicated poor illumination of a subsurface location, a second marine survey along at least a portion of the survey route 442 may have been performed to enhance illumination of the subsurface location. For example, during the second marine survey, the receiver vessel 418 may have navigated again along a portion of the survey route 442 that traverses the subsurface obstruction 436, significantly increasing the cost of obtaining the marine survey data.

In contrast, in at least one embodiment of the present disclosure, during a marine survey and in response to marine survey data acquired from the marine survey indicating worsening or poor illumination of a subsurface location (for example, the target subsurface location 438), the source vessel 450 can be activated from a standby mode (on an as needed basis) to enhance illumination of the subsurface location. A survey plan can be dynamically updated during the marine survey ("on-the-fly") to modify the survey route of the source vessel 450 to include and pass through new actuation locations. The new actuation locations can be in addition to actuation locations already included in the survey plan, replace an actuation location already included in the survey plan, or combinations thereof. During the marine survey and in response to the marine survey data indicating worsening or poor illumination of the subsurface location, at least one actuation location for actuation of the secondary source 452 that enhances illumination of the subsurface location can be determined as described herein. During the marine survey, the survey plan can be dynamically updated to modify the survey route of the source vessel 450 to pass through the at least one actuation location so that the secondary source 452 can be actuated at the at least one actuation location, in addition to a primary source, to enhance illumination of the subsurface location.

Although not specifically illustrated by FIG. 4, a computing system can be in communication with a receiver towed by the receiver vessel 418 (for example, a receiver of one of the streamers 420). The computing system can include a processing resource (for example, the processing resources 1391 illustrated in FIG. 13) and a memory resource (for example, the memory resources 1393 illustrated in FIG. 13). The computing system can be onboard the source vessel 450, onboard the receiver vessel 418, or remote therefrom. The computing system can be configured to, during a marine survey, receive marine survey data from the receiver vessel 418 indicating an illumination of a subsurface, determine an obstructed portion of the subsurface based on the indicated illumination, determine an actuation location to further illuminate the obstructed portion of the subsurface, and determine a survey route of the source vessel 450 to pass through the actuation location.

In at least one embodiment, the computing system can be configured to determine a different obstructed portion of the subsurface based on the indicated illumination and determine a different actuation location to further illuminate the different obstructed portion of the subsurface. The computing system can be configured to dynamically update, as the different obstructed portion of the subsurface is determined, a survey plan to include the different actuation location. The computing system can be configured to dynamically update a survey plan, as the different obstructed portion of the subsurface is determined, to modify an existing survey route of the source vessel 450 to pass through the different actuation location. The computing system can be configured to dynamically update a survey plan, as the different obstructed portion of the subsurface is determined, to include a new survey route of the source vessel 450 to navigate the source vessel 450 to the different actuation location. The source vessel 450 can be configured to dynamically change the position and the bottom speed thereof relative to the position and the bottom speed of the receiver vessel 418 according to the updated survey plan.

Figure 5:
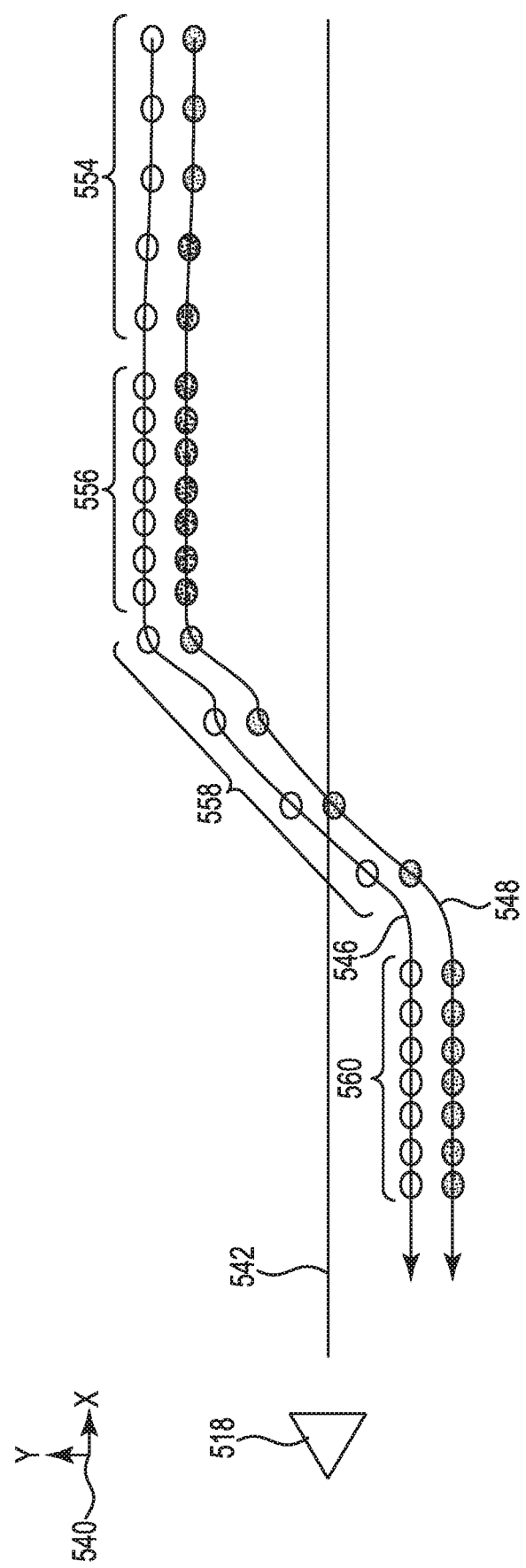
FIG. 5 illustrates a plan or xy-plane view of survey routes of source vessels.

Although not specifically illustrated by FIG. 4, another source vessel in addition to the source vessel 450 can be used to perform a marine survey. The other source vessel can be configured to tow and actuate a different source, such as a different secondary source. For example, FIG. 5 illustrates survey routes for two source vessels to navigate along concurrently. The computing system can be configured to determine a different actuation location to further illuminate the obstructed portion of the subsurface that is not along the survey route of the source vessel 450. The computing system can be configured to determine a survey route of the other source vessel to pass through the different actuation location and dynamically update a survey plan to include the determined survey route of the other source vessel. The other source vessel can be configured to change a position and a bottom speed thereof relative to the position and the bottom speed of the receiver vessel 418 according to the survey route of the other source vessel.

FIG. 5 illustrates a plan or xy-plane 540 view of survey routes 546 and 548 of source vessels. The source vessels are not shown in FIG. 5. The receiver vessel 518 is towing streamers along the survey route 542; however, the streamers are not illustrated by FIG. 5 for clarity and ease of illustration. A first source vessel (for example, the source vessel 450 described in association with FIG. 4) can navigate along the survey route 546 and a second source vessel can navigate along the survey route 548. The first and second source vessels are not illustrated by FIG. 5 for clarity and ease of illustration.

Each circle along the survey routes 546 and 548 represent an actuation location for a respective secondary source coupled to each source vessel. The actuation locations illustrated by FIG. 5 can be a subset of the possible actuation locations 344 described in association with FIG. 3. For example, the actuation locations along the survey routes 546 and 548 can be actuation locations of the possible actuation locations 344 that provide an illumination of a subsurface location that exceeds a threshold. It should be noted that the survey routes 546 and 548 do not necessarily determine the actuation locations. Rather, actuation locations that enhance illumination of a subsurface location are determined (for example, actuation locations providing an illumination greater than a threshold) and then a survey route for source vessels are routed through those actuation locations. Because the source vessels are not kept in lock step with the receiver vessel 518 or at a fixed position relative to the receiver vessel 518, actuation locations determined to provide an illumination greater than a threshold (such as a subset of the possible actuation locations 344 described in association with FIG. 3) can be used to enhance illumination of a subsurface location regardless of positions of the actuation locations relative to a position of the receiver vessel 518 along the survey route 542 or a bottom speed of the receiver vessel 518.

As illustrated by FIG. 5, the source vessels can change their respective cross-line and in-line positions relative to the receiver vessel 518. For example, along a first portion 554 and a second portion 556 of the survey routes 546 and 548, the source vessels are on one side of the survey route 542. Then, along a third portion 558 of the survey routes 546 and 548, the source vessels transition from one side of the survey route 542 to the other side of the survey route 542 in a cross-line direction. Along a fourth portion 560 of the survey routes 546 and 548, the source vessels are on the other side of the survey route 542.

As illustrated by FIG. 5, the source vessels can change their respective bottom speeds as they navigate along the survey routes 546 and 548, respectively. For example, along the second portion 556 of the survey routes 546 and 548, the source vessels can navigate along the survey routes 546 and 548 at a slower bottom speed than along the first portion 554 of the survey routes 546 and 548. This enables more actuations of the secondary source coupled to the source vessels within the second portion 556 of the survey routes 546 and 548 than within the first portion 554 of the survey routes 546 and 548. The second portion 556 of the survey routes 546 and 548 can be near a subsurface obstruction, for example. The actuations of the secondary source, in addition to or instead of actuations of the primary source, can enhance illumination of a subsurface location by providing additional marine survey data associated with increased density of actuations of the secondary source in the second portion 556 of the survey routes 546 and 548 as compared to the first portion 554 of the survey routes 546 and 548.

As illustrated by FIG. 5, the timing of actuations of the secondary source can vary as the source vessels navigate along the survey routes 546 and 548. Instead of changing a bottom speed of a source vessel along a survey route to change a density of actuations of a secondary source coupled thereto along a portion of the survey route, timing of the actuations (for example, a time interval between actuations) of the secondary source can be changed. For example, along the second portion 556 of the survey routes 546 and 548, the secondary source coupled to the source vessels can be actuated with a shorter time interval in between actuations than along the first portion 554 of the survey routes 546 and 548. Timing of actuations of a secondary source can be independent of timing of actuations of a primary source. For example, for at least a portion of a marine survey, a time interval between actuations of a secondary source can be shorter or longer than a time interval between actuations of a primary source.

The source vessels can change their respective bottom speeds to change their respective in-line positions relative to the receiver vessel 518. For example, a source vessel can speed up for a period of time to get ahead of the receiver vessel 518. Similarly, a source vessel can slow down for a period of time to lag further behind the receiver vessel 518. The receiver vessel 518 can maintain a constant bottom speed along the survey route 542; however, embodiments of the present disclosure are not so limited. For at least a portion of a marine survey, a bottom speed of a source vessel can be independent of a bottom speed of a receiver vessel Although FIG. 5 illustrates survey routes of two source vessels (the survey routes 546 and 548), embodiments of the present disclosure are not so limited. For example, at least one embodiment can include a survey route of a single source vessel or survey routes of greater than two source vessels. Although FIG. 5 illustrates the survey routes 546 and 548 being parallel and synchronous, embodiments of the present disclosure are not so limited. For example, at least one embodiment can include survey routes of source vessels that intersect, merge together, diverge apart, or combinations thereof. In at least one embodiment, a first source vessel can navigate along a first survey route at a bottom speed different than a bottom speed at which a second source vessel navigates along a second survey route. In at least one embodiment, a quantity of actuation locations along a first survey route of a first source vessel can be different than a quantity of actuation locations along a second survey route of a second source vessel. In at least one embodiment, spacing (density) of actuation locations along a first survey route of a first source vessel can be different than spacing (density) of actuation locations along a second survey route of a second source vessel.

Figure 6B:
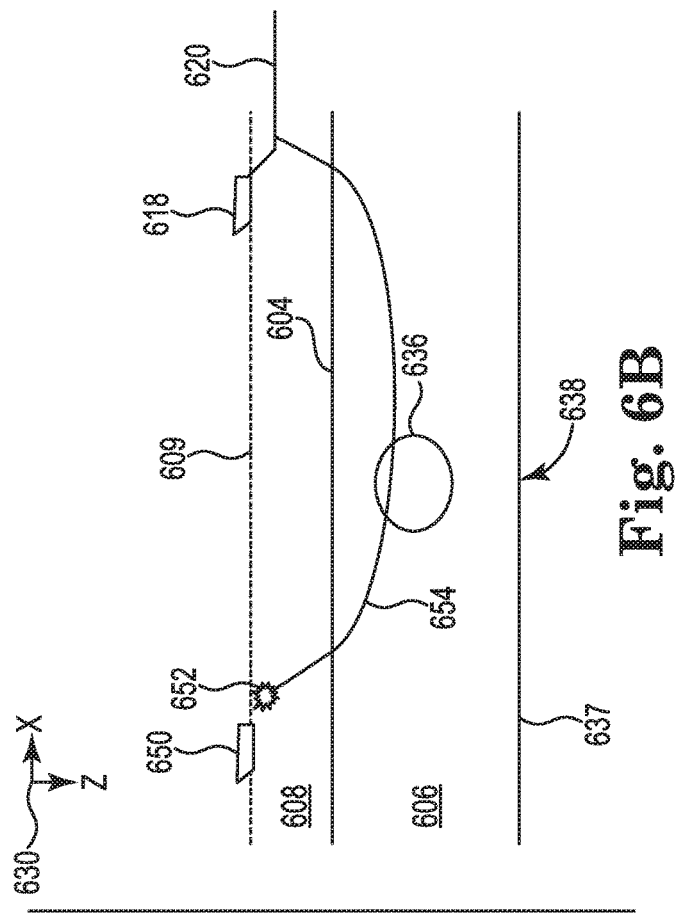
FIG. 6B illustrates an elevation or xz-plane view of an exemplary marine survey of a subsurface volume including a subsurface obstruction using a source vessel.
Figure 6A:
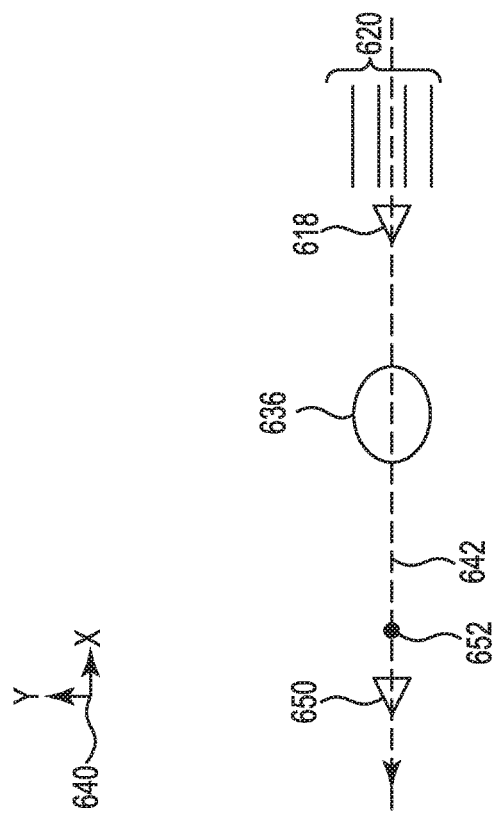
FIG. 6A illustrates a plan or xy-plane view of an exemplary marine survey of a subsurface volume including a subsurface obstruction using a source vessel.

FIG. 6A illustrates a plan or xy-plane 640 view of an exemplary marine survey of a subsurface volume 606 including a subsurface obstruction 636 using a source vessel 650. FIG. 6B illustrates an elevation or xz-plane view 630 of the exemplary marine survey of the subsurface volume 606 including the subsurface obstruction 636 using the source vessel 650. FIGS. 6A-6B illustrate a receiver vessel 618 towing streamers 620 along a survey route 642 on a sea surface 609.

The receiver vessel 618 is approaching the subsurface obstruction 636. A target subsurface location 638 on a subsurface reflector 637 underlies the subsurface obstruction 636. The secondary source 652 is illustrated as being actuated at an actuation location ahead of the receiver vessel 618 and on the opposite side of the subsurface obstruction 636 than the receiver vessel 618 can enable refracted events to be recorded. An offset between the actuation location of the secondary source 652 and a receiver on the streamer 620 is such that acoustic energy from the actuation of the secondary source 652 refracts through the subsurface obstruction 636. Refracted events can be indicative of a change in velocity of acoustic energy from a source in a subsurface. For example, a refracted event may occur when there is an increase in velocity of acoustic energy from the actuation of the secondary source 652 as the acoustic energy transitions from one layer of the subsurface volume 606 to another layer of the subsurface volume 606. This information from refracted events can be beneficial for generating a velocity model of the target subsurface location 638, such as in full waveform inversion (FWI).

For example, as represented by a ray path 654, actuating the secondary source 652 at such an actuation location as illustrated by FIGS. 6A-6B enables acoustic energy from the actuation of the secondary source 652 to refract through the subsurface obstruction 636 to at least a portion of the streamers 620.

Figure 7B:
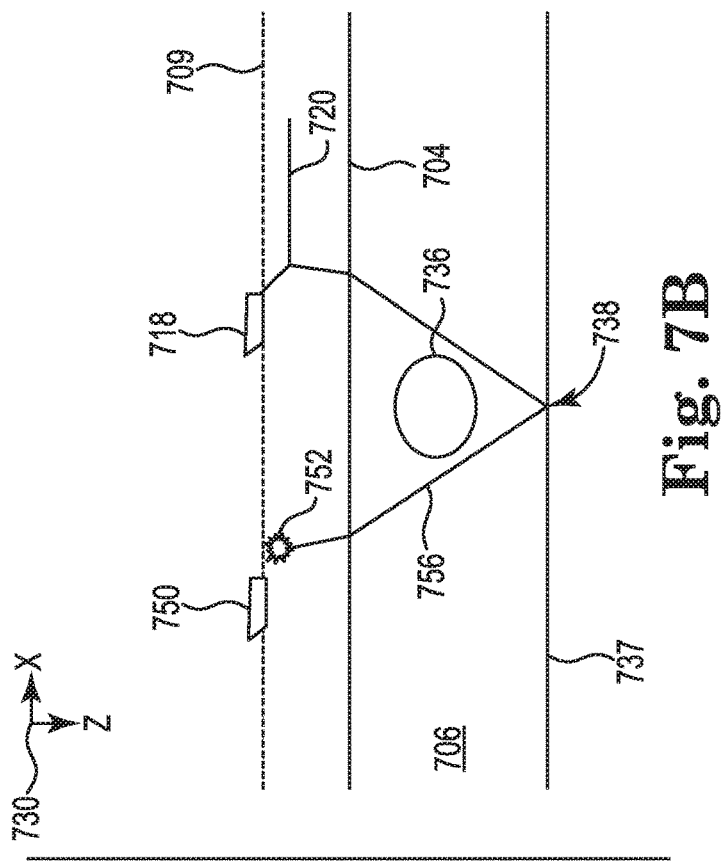
FIG. 7B illustrates an elevation or xz-plane view of an exemplary marine survey of a subsurface volume including a subsurface obstruction using a source vessel subsequent to FIG. 6B.
Figure 7A:
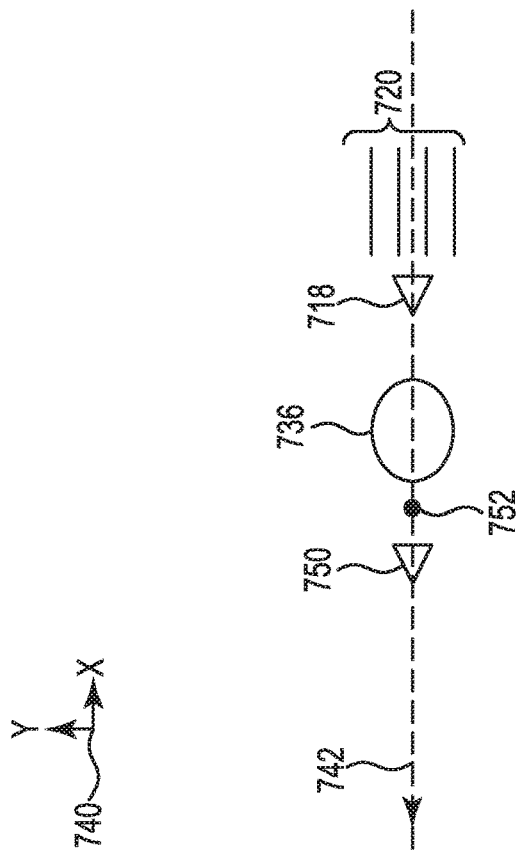
FIG. 7A illustrates a plan or xy-plane view of an exemplary marine survey of a subsurface volume including a subsurface obstruction using a source vessel subsequent to FIG. 6A.

FIG. 7A illustrates a plan or xy-plane view 740 of the exemplary marine survey of the subsurface volume 706 including the subsurface obstruction 736 using the source vessel 750 subsequent to FIG. 6A. FIG. 7B illustrates an elevation or xz-plane view 730 of the exemplary marine survey of the subsurface volume 706 including the subsurface obstruction 736 using the source vessel 750 subsequent to FIG. 6B.

As illustrated by FIGS. 7A-7B, the receiver vessel 718 is closer to the subsurface obstruction 736 along the survey route 742 than as illustrated in FIGS. 6A-6B but is not yet directly over the subsurface obstruction 736. The source vessel 750 can navigate from the actuation location illustrated by FIGS. 6A-6B to the actuation location illustrated by FIGS. 7A-7B. By navigating to the actuation location illustrated by FIGS. 7A-7B, an in-line distance between the source vessel 750 and the receiver vessel 718 is decreased as compared to an in-line distance between the source vessel 650 and the receiver vessel 618 illustrated by FIGS. 6A-6B. Thus, the source vessel 750 does not maintain a fixed position relative to the receiver vessel 718.

Because the receiver vessel 718 is closer to the subsurface obstruction 736, actuating the secondary source 752 at an actuation location ahead of the receiver vessel 718 and on the opposite side of the subsurface obstruction 736 than the receiver vessel 718 but closer to the subsurface obstruction 736 (not as far along the survey route 742 in FIGS. 7A-7B, for example) can enable reflected events off the subsurface reflector 737 at the target subsurface location 738 to be recorded. An offset between the actuation location of the secondary source 752 and a receiver on the streamer 720 is such that acoustic energy from the actuation of the secondary source 752 reflects off the subsurface reflector 737 at the target subsurface location 738.

For example, as represented by a ray path 756, actuating the secondary source 752 at such an actuation location as illustrated by FIGS. 7A-7B enables acoustic energy from the actuation of the secondary source 752 to reflect off the subsurface reflector 737 at the target subsurface location 738 to at least a portion of the streamers 720, avoiding the subsurface obstruction 736. As a result, reflected events from the target subsurface location 738 can be recorded.

Figure 8B:
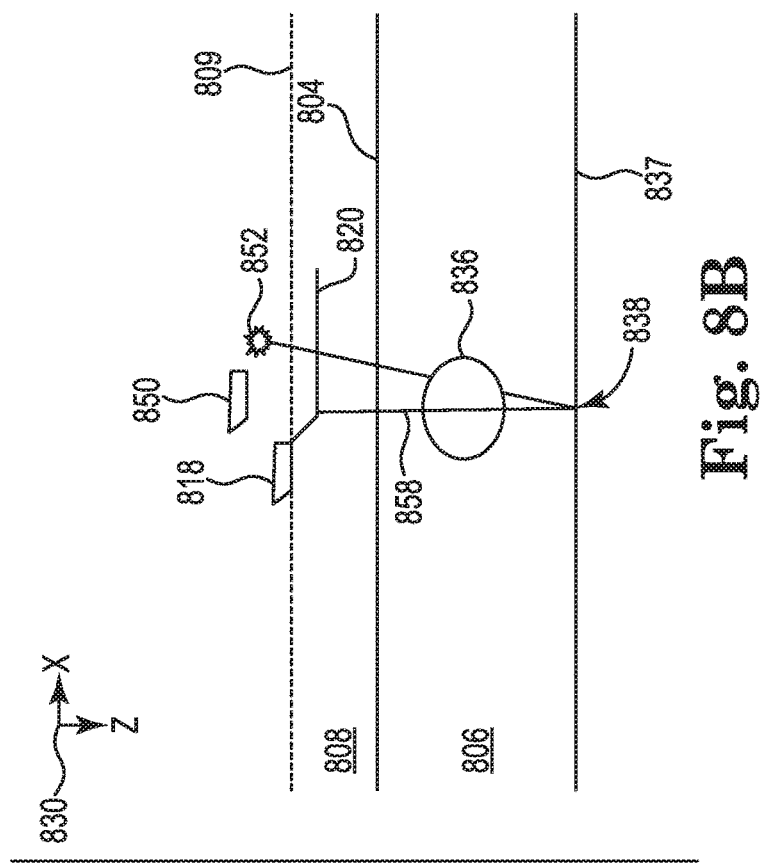
FIG. 8B illustrates an elevation or xz-plane view of an exemplary marine survey of a subsurface volume including a subsurface obstruction using a source vessel subsequent to FIG. 7B.
Figure 8A:
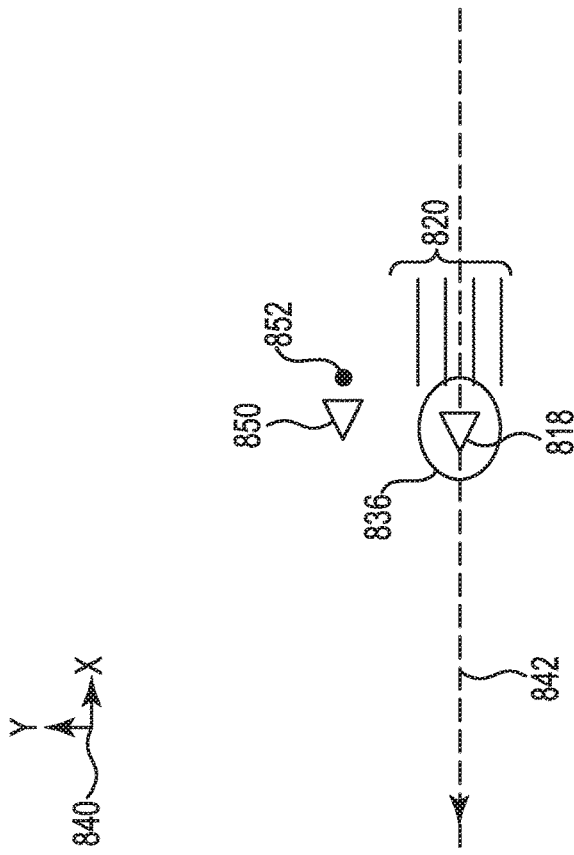
FIG. 8A illustrates a plan or xy-plane view of an exemplary marine survey of a subsurface volume including a subsurface obstruction using a source vessel subsequent to FIG. 7A.

FIG. 8A illustrates a plan or xy-plane view 840 of the exemplary marine survey of the subsurface volume 806 including the subsurface obstruction 836 using the source vessel 850 subsequent to FIG. 7A. FIG. 8B illustrates an elevation or xz-plane view 830 of the exemplary marine survey of the subsurface volume 806 including the subsurface obstruction 836 using the source vessel 850 subsequent to FIG. 7B.

The source vessel 850 can navigate from the actuation location illustrated by FIGS. 7A-7B to the actuation location illustrated by FIGS. 8A-8B in response to the receiver vessel 818 being directly over the subsurface obstruction 836. By navigating to the actuation location illustrated by FIGS. 8A-8B, an in-line distance between the source vessel 850 and the receiver vessel 818 is decreased and a cross-line distance between the source vessel 850 and the receiver vessel 818 is increased as compared to the in-line and cross-line distances between the source vessel 750 and the receiver vessel 718 illustrated by FIGS. 7A-7B. Thus, the source vessel 850 does not maintain a fixed position relative to the receiver vessel 818. The source vessel 850 is to the side of the receiver vessel 818 as illustrated by FIG. 8A, although FIG. 8B illustrates the source vessel 850 as being above and behind the receiver vessel 818 in an effort to illustrate depth in the two-dimensional elevation view illustrated by FIG. 8B.

As illustrated by FIGS. 8A-8B, the receiver vessel 818 is now directly over the subsurface obstruction 836 along the survey route 842. Because the receiver vessel 818 is directly over the subsurface obstruction 836, actuating the secondary source 852 at an actuation location to a side (in a cross-line direction, for example) of the receiver vessel 818 and the subsurface obstruction 836 can enable reflected events off the subsurface reflector 837 at the target subsurface location 838 to be recorded. Despite being directly over the subsurface obstruction 836, an offset between the actuation location of the secondary source 852 and a receiver on the streamer 820 is such that acoustic energy from the actuation of the secondary source 852 reflects off the subsurface reflector 837 at the target subsurface location 838 and reaches at least one of the streamers 820.

For example, as represented by a ray path 858, actuating the secondary source 852 at an actuation location to a side in a cross-line direction of the receiver vessel 818 and the subsurface obstruction 836 as illustrated by FIGS. 8A-8B enables at least a portion of acoustic energy from the actuation of the secondary source 852 to reflect off the subsurface reflector 837 at the target subsurface location 838 to at least a portion of the streamers 820, avoiding the subsurface obstruction 836. As a result, reflected events from the target subsurface location 838 can be recorded.

Figure 9B:
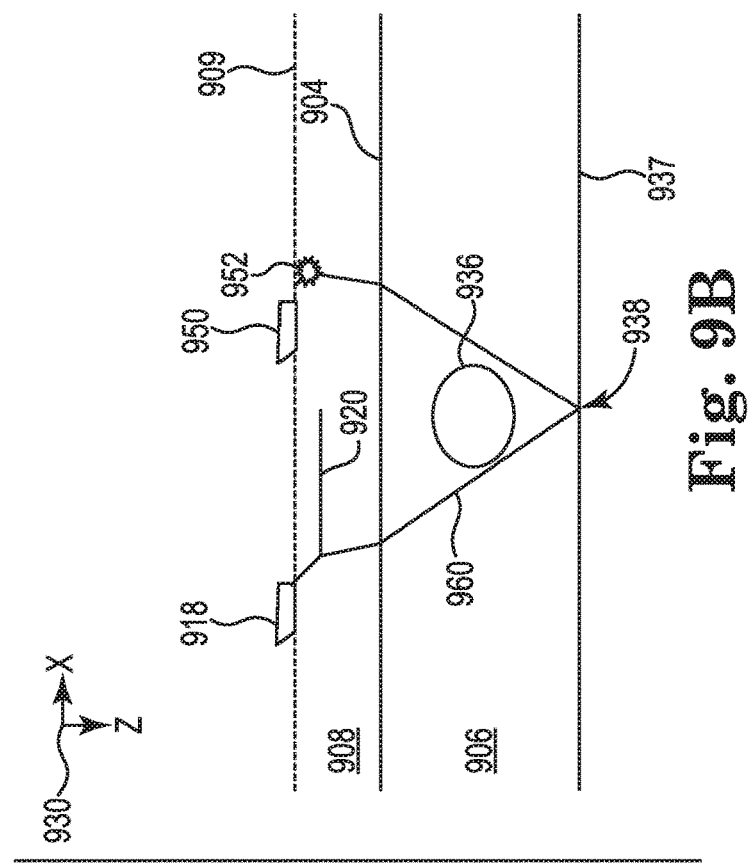
FIG. 9B illustrates an elevation or xz-plane view of an exemplary marine survey of a subsurface volume including a subsurface obstruction using a source vessel subsequent to FIG. 8B.
Figure 9A:
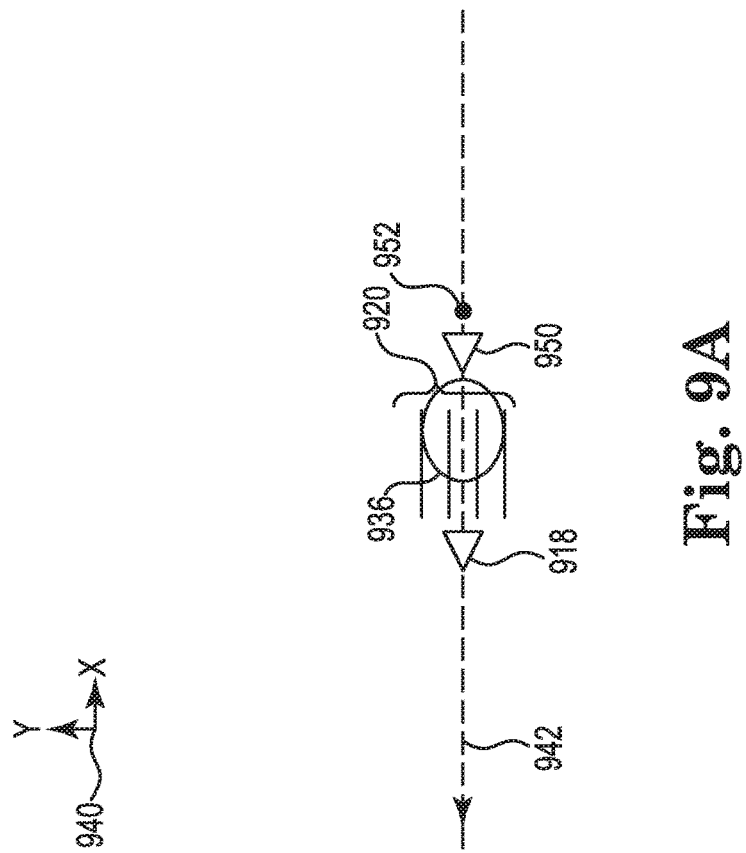
FIG. 9A illustrates a plan or xy-plane view of an exemplary marine survey of a subsurface volume including a subsurface obstruction using a source vessel subsequent to FIG. 8A.

FIG. 9A illustrates a plan or xy-plane view 940 of the exemplary marine survey of the subsurface volume 906 including the subsurface obstruction 936 using the source vessel 950 subsequent to FIG. 8A. FIG. 9B illustrates an elevation or xz-plane view 930 of the exemplary marine survey of the subsurface volume 906 including the subsurface obstruction 936 using the source vessel 950 subsequent to FIG. 8B.

The source vessel 950 can navigate from the actuation location illustrated by FIGS. 8A-8B to the actuation location illustrated by FIGS. 9A-9B. By navigating to the actuation location illustrated by FIGS. 9A-9B, an in-line distance between the source vessel 950 and the receiver vessel 918 is increased and a cross-line distance between the source vessel 950 and the receiver vessel 918 is decreased as compared to the in-line and cross-line distances between the source vessel 850 and the receiver vessel 818 illustrated by FIGS. 8A-8B. Thus, the source vessel 950 does not maintain a fixed position relative to the receiver vessel 918.

As illustrated by FIGS. 9A-9B, the receiver vessel 918 has traversed the subsurface obstruction 936 along the survey route 942. Because the receiver vessel 918 is ahead of the subsurface obstruction 936 but is still close to the subsurface obstruction 936 (further along the survey route 842 in FIGS. 8A-8B, for example), actuating the secondary source 952 at an actuation location behind the receiver vessel 918 and on the opposite side of the subsurface obstruction 936 than the receiver vessel 918 can enable reflected events off the subsurface reflector 937 at the target subsurface location 938 to be recorded. An offset between the actuation location of the secondary source 952 and a receiver on the streamer 920 is such that acoustic energy from the actuation of the secondary source 952 reflects off the subsurface reflector 937 at the target subsurface location 938.

For example, as represented by a ray path 960, actuating the secondary source 952 at such an actuation location as illustrated by FIGS. 9A-9B enables acoustic energy from the actuation of the secondary source 952 to reflect off the subsurface reflector 937 at the target subsurface location 938 to at least a portion of the streamers 920, avoiding the subsurface obstruction 936. As a result, reflected events from the target subsurface location 938 can be recorded.

Figure 10B:
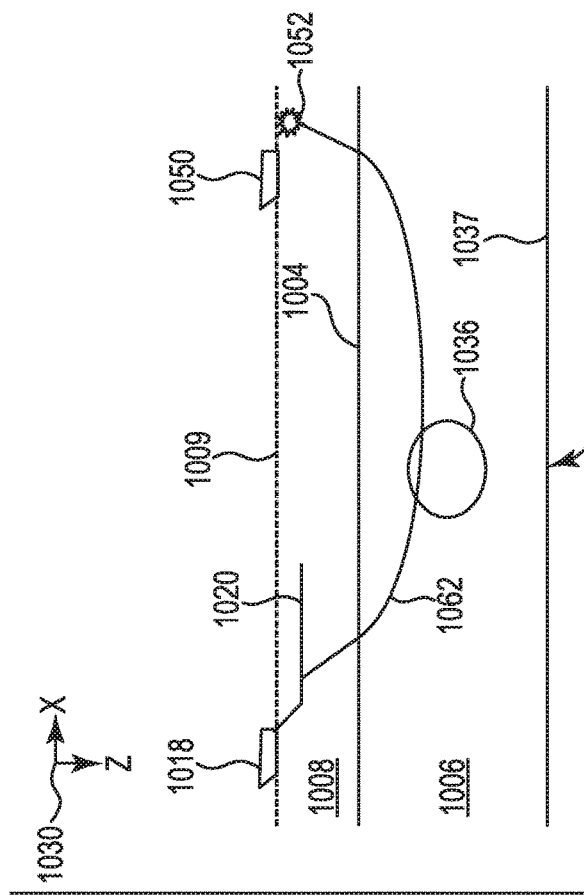
FIG. 10B illustrates an elevation or xz-plane view of an exemplary marine survey of a subsurface volume including a subsurface obstruction using a source vessel subsequent to FIG. 9B.
Figure 10A:
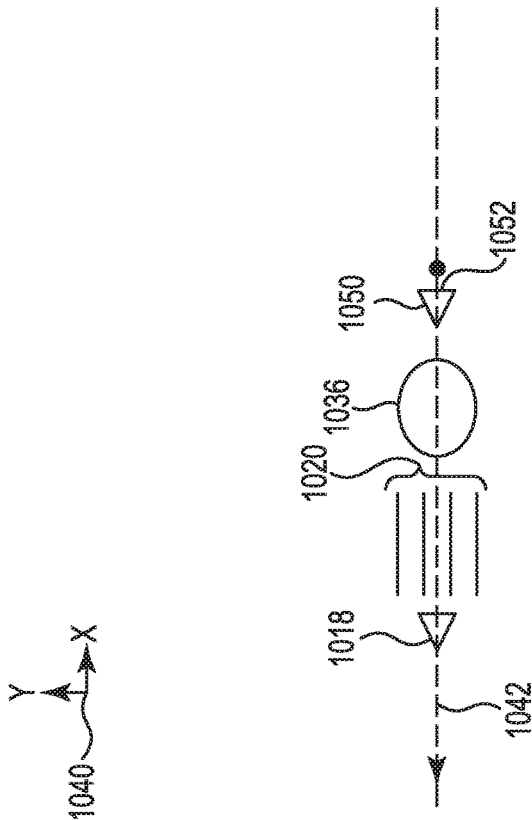
FIG. 10A illustrates a plan or xy-plane view of an exemplary marine survey of a subsurface volume including a subsurface obstruction using a source vessel subsequent to FIG. 9A.

FIG. 10A illustrates a plan or xy-plane view 1040 of the exemplary marine survey of the subsurface volume 1006 including the subsurface obstruction 1036 using the source vessel 1050 subsequent to FIG. 9A. FIG. 10B illustrates an elevation or xz-plane 1030 view of the exemplary marine survey of the subsurface volume 1006 including the subsurface obstruction 1036 using the source vessel 1050 subsequent to FIG. 9B.

The source vessel 1050 can navigate from the actuation location illustrated by FIGS. 9A-9B to the actuation location illustrated by FIGS. 10A-10B. By navigating to the actuation location illustrated by FIGS. 9A-9B, an in-line distance between the source vessel 1050 and the receiver vessel 1018 is increased as compared to the in-line distance between the source vessel 950 and the receiver vessel 918 illustrated by FIGS. 9A-9B. Thus, the source vessel 1050 does not maintain a fixed position relative to the receiver vessel 1018.

As illustrated by FIGS. 10A-10B, the receiver vessel 1018 is further along the survey route 1042 and further away from the subsurface obstruction 1036 than as illustrated by FIGS. 9A-9B. Because the receiver vessel 1018 is ahead of the subsurface obstruction 1036 and further away from the subsurface obstruction 1036 (further along the survey route 942 in FIGS. 9A-9B, for example), actuating the secondary source 1052 at an actuation location behind the receiver vessel 1018 further away from the subsurface obstruction 1036 than the actuation location illustrated by FIGS. 9A-9B and on the opposite side of the subsurface obstruction 1036 than the receiver vessel 1018 can enable refracted events to be recorded. An offset between the actuation location of the secondary source 1052 and a receiver on the streamer 1020 is such that acoustic energy from the actuation of the secondary source 1052 refracts through the subsurface obstruction 1036.

For example, as represented by a ray path 1062, actuating the secondary source 1052 at such an actuation location as illustrated by FIGS. 10A-10B enables acoustic energy from the actuation of the secondary source 1052 to refract through the subsurface obstruction 1036 to at least a portion of the streamers 1020. As a result, refracted events from the subsurface obstruction 1036 can be recorded. As described herein, recording refracted events can provide beneficial information for generating a velocity model of the target subsurface location 1038.

At least one embodiment of the present disclosure can include, during a marine survey, positioning a first marine survey vessel towing a source relative to a second marine survey vessel towing a streamer based on a position of the second marine survey vessel along a survey route relative to a subsurface obstruction. In at least one embodiment, positioning the first marine survey vessel can include positioning the first marine survey vessel at an acquisition location on an opposite side of the subsurface obstruction than the first marine survey vessel. Subsequent to positioning the first marine survey vessel, the source can be actuated at the acquisition location such that at least a portion of the streamer receives energy refracted through the subsurface obstruction. In at least one embodiment, positioning the first marine survey vessel can include positioning the first marine survey vessel at a different actuation location closer to the subsurface obstruction. Subsequent to positioning the first marine survey vessel, the source can be actuated at the different acquisition location such that at least a portion of the streamer receives energy reflected off a subsurface reflector at a target subsurface location underlying the subsurface obstruction.

In at least one embodiment, positioning the first marine survey vessel can include, responsive to the second marine survey vessel sailing over the subsurface obstruction along the survey route, positioning the first marine survey vessel at an acquisition location at a cross-line offset from the survey route, the second marine survey vessel, and the subsurface obstruction. Subsequent to positioning the first marine survey vessel, the source can be actuated at the acquisition location such that energy from the actuation of the source reflects off a subsurface reflector at a target subsurface location underlying the subsurface obstruction.

In at least one embodiment, the second marine survey vessel can tow a streamer spread including the streamer. The first marine survey vessel can be positioned relative to the second marine survey vessel based on characteristics of the streamer spread as the streamer spread is towed along the survey route.

At least one embodiment of the present disclosure can include, during a first portion of a marine survey, actuating a first source coupled to a first marine survey vessel to perform the marine survey, determining a subsurface location having an illumination below a threshold, and determining an actuation location to enhance illumination of the subsurface location based on a priori data of the subsurface location. During a second portion of the marine survey, a second marine survey vessel can be activated from a standby mode in response to determining the subsurface location having the illumination below the threshold and a second source coupled to the second marine survey vessel can be actuated at the actuation location.

At least one embodiment of the present disclosure can include determining a plurality of possible actuation locations for actuation of a source towed by a first marine survey vessel relative to a survey route of a second marine survey vessel towing a streamer spread based on characteristics of the streamer spread as the streamer spread is towed along the survey route and based on a priori data of a subsurface obstruction along the survey route. Contributions of each of the plurality of possible actuation locations to a subsurface image can be evaluated based on a criterion. An actuation location can be selected from the plurality of possible actuation locations based on the contribution of the actuation location meeting the criterion. The contribution of each of the plurality of possible actuation locations can be evaluated based on a quantity of reflected events in a subsurface location recorded by the streamer spread from a respective actuation of the source at a respective one of the plurality of possible actuation locations. The contribution of each of the plurality of possible actuation locations can be evaluated based on a distribution of reflection angles and azimuths in a subsurface location. The contribution of each of the plurality of possible actuation locations can be evaluated based on a quantity of refracted events through the subsurface obstruction recorded by the streamer spread from a respective actuation of the source at a respective one of the plurality of possible actuation locations. The contribution of each of the plurality of possible actuation locations can be evaluated based on amplitudes of reflected events in a subsurface location recorded by the streamer spread from a respective actuation of the source at a respective one of the plurality of possible actuation locations. The contribution of each of the plurality of possible actuation locations can be evaluated based on geophysical parameters of a subsurface location (for example, a signal-to-noise ratio (SNR) or resolution of an image of a subsurface location). The contribution of each of the plurality of possible actuation locations can be evaluated based on the criterion and a weight assigned to the criterion.

At least one embodiment of the present disclosure can reduce the need to acquire infill lines. During a marine survey, a position of a source or a receiver may change, for example, as a result of environmental conditions or sea surface currents. Such a change in position of a source or a receiver, can cause a coverage gap in a survey of a subsurface location. Illumination of a portion of a subsurface location within a coverage gap can be poor. During a marine survey, a position of a source or a receiver can be analyzed for changes from a planned position of the source or receiver. In response to a survey route of a receiver vessel being near a coverage gap, a source vessel can be positioned relative to the receiver vessel to provide enhanced illumination of a portion of a subsurface location within the coverage gap. At least one embodiment of the present disclosure can include, during a marine survey, detecting a change in a position of a first streamer coupled to a first marine survey vessel relative to a position of a second streamer coupled to the first marine survey vessel. Responsive to detecting the change in the position of the first streamer relative to the second streamer above a threshold, an actuation location for actuation of a source coupled to a second marine survey vessel based on a source route of the second marine survey vessel can be determined. During the marine survey, the second marine survey vessel can be navigated to the actuation location by changing at least a cross-line position or an in-line position of the first marine survey vessel relative to a position of the first marine survey vessel. Responsive to detecting a change in the position of the first streamer relative to the second streamer at or below the threshold, an approximate constant position of the second marine survey vessel relative to the first marine survey vessel can be maintained.

Figure 11:
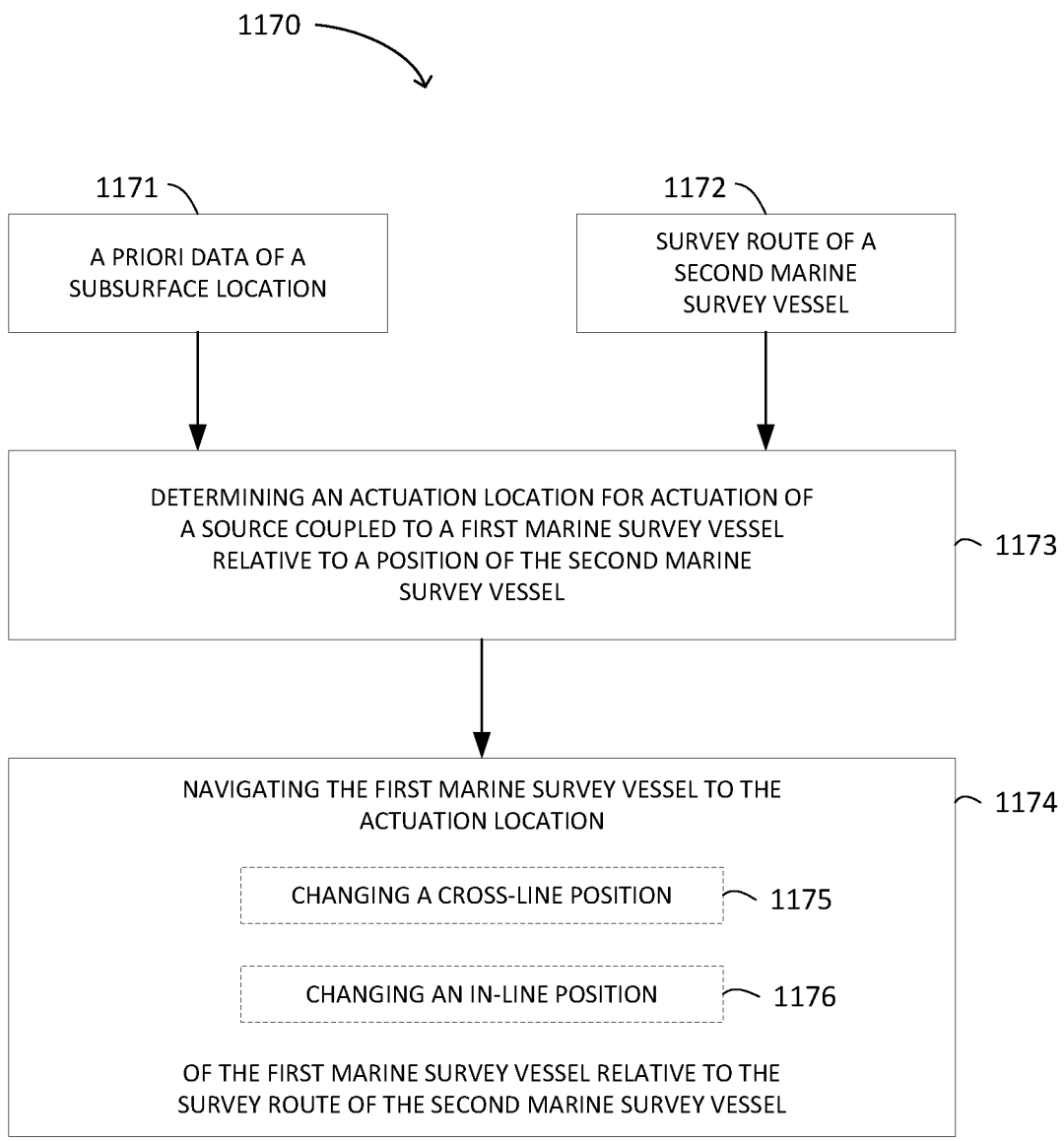
FIG. 11 illustrates an exemplary embodiment of a method for marine surveying using a source vessel.

FIG. 11 illustrates an exemplary embodiment of a method 1170 for marine surveying using a source vessel. In at least one embodiment, the method 1170 can be performed by a machine, such as the machine 1392 described in association with FIG. 13. At 1173, the method 1170 can include determining an actuation location for actuation of a first source coupled to a first marine survey vessel relative to a position of a second marine survey vessel towing a receiver. The determination, at 1173, can be based on, at 1172, a survey route of the second marine survey vessel and, at 1171, a priori data of a subsurface location. The determined actuation location can enhance illumination of the subsurface location. Determining the actuation location can include at least one of using raytracing, using a wave equation, and using a full waveform model.

At 1174, the method 1170 can include navigating the first marine survey vessel along a survey route of the first marine survey vessel to the actuation location during a marine survey. Navigating the first marine survey vessel can include, at 1175, changing at least a cross-line position relative to the survey route of the second marine survey vessel, at 1176, changing an in-line position of the first marine survey vessel relative to the survey route of the second marine survey vessel, or combinations thereof. Navigating the first marine survey vessel to the actuation location can include changing a bottom speed of the first marine survey vessel relative to a bottom speed of the second marine survey vessel.

Although not illustrated by FIG. 11, in at least one embodiment, the method 1170 can include performing a first portion of a marine survey using a second source not coupled to the first marine survey vessel and not using the first source and performing a second portion of the marine survey using the first and second sources. During the first portion of the marine survey, an approximate constant distance between the first marine survey vessel and the second marine survey vessel can be maintained. During the second portion of the marine survey, the first marine survey vessel can be navigated to the actuation location. The actuation location can be at a different position relative to the second marine survey vessel than the position at which the first marine survey vessel maintains the constant distance away from the second marine survey vessel. For example, the first marine survey vessel can be navigated from the position at which the first marine survey vessel maintains the constant distance away from the second marine survey vessel to the actuation location. During the first portion of the marine survey, whether the subsurface location has an illumination below a threshold can be determined and the actuation location can be determined. During the second portion of the marine survey, the first marine survey vessel can be activated from a standby mode in response to determining the subsurface location having the illumination below the threshold and the first source can be actuated at the actuation location.

In at least one embodiment, the method 1170 can include determining a plurality of subsurface locations having illuminations below a threshold and determining a plurality of actuation locations, including the actuation location, for actuations of the first source relative to the position of the second marine survey vessel to enhance illumination of each of the plurality of subsurface locations based on the survey route of the second marine survey vessel and the a priori data of the plurality of subsurface locations. The survey route of the first marine survey vessel including the plurality of actuation locations can be determined.

In accordance with at least one embodiment of the present disclosure, a geophysical data product may be produced or manufactured. Geophysical data may be obtained and stored on a non-transitory, tangible machine-readable medium. The geophysical data product may be produced by processing the geophysical data offshore or onshore either within the United States or in another country. If the geophysical data product is produced offshore or in another country, it may be imported onshore to a facility in the United States. During a marine survey, an actuation location for actuation of a source coupled to a first marine survey vessel relative to a position of a second marine survey vessel towing a receiver to enhance illumination of a subsurface location can be determined based on a survey route of the second marine survey vessel and a priori data of the subsurface location. During the marine survey, the first marine survey vessel can be navigated along a survey route of the first marine survey vessel to the actuation location by changing at least a cross-line position or an in-line position of the first marine survey vessel relative to the survey route of the second marine survey vessel. The actuation location can be determined offshore or onshore. Geophysical data can be obtained using the receiver and the geophysical data can be recorded on a non-transitory machine-readable medium, thereby creating the geophysical data product. In some instances, once onshore in the United States, geophysical analysis may be performed on the geophysical data product. In some instances, geophysical analysis may be performed on the geophysical data product offshore.

Figure 12:
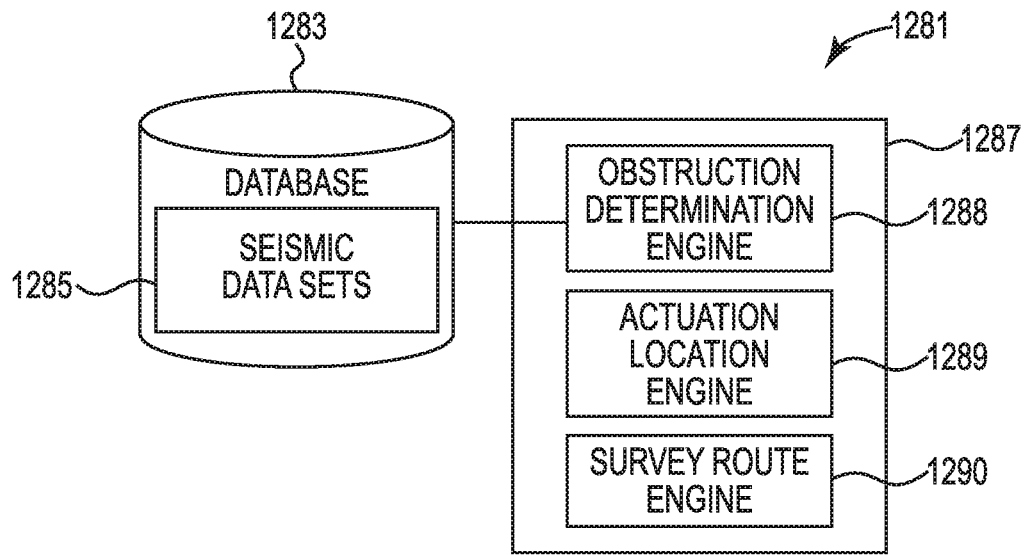
FIG. 12 illustrates an exemplary embodiment of a system for marine surveying using a source vessel.

FIG. 12 illustrates an exemplary embodiment of a system 1281 for marine surveying using a source vessel. The system 1281 can include a database 1283, a subsystem 1287, and/or a number of engines, such as an obstruction determination engine 1288, an actuation location engine 1289, and a survey route engine 1290. The subsystem 1287 can be analogous to the controller 119 or a controller onboard the source vessel 150 illustrated by FIG. 1 in at least one embodiment. The subsystem 1287 and engines can be in communication with the database 1283 via a communication link. The database can store seismic data sets 1285, which can include a priori data of a subsurface location, such as the subsurface volume 106 illustrated by FIG. 1.

The system 1281 can include more or fewer engines than illustrated to perform the various functions described herein. The system 1281 can represent program instructions and/or hardware of a machine such as the machine 1392 referenced in FIG. 13, etc. As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium, etc., as well as hard-wired program such as logic. Hard-wired program instructions can be considered as both program instructions and hardware.

The obstruction determination engine 1288 can include a combination of hardware and program instructions that is configured to determine whether an illumination of a subsurface location is below a threshold. The actuation location engine 1289 can be configured to, responsive to a determination that the illumination is below the threshold, determine a plurality of actuation locations for actuation of a source towed by a first marine survey vessel relative to a survey route of a second marine survey vessel towing a receiver. The plurality of actuation locations can be determined from a plurality of possible actuation locations based on the survey route of the second marine survey vessel. The survey route engine 1290 can be configured to actuate the second source at least one of the plurality of actuation locations.

In at least one embodiment, the obstruction determination engine 1288 can be configured to determine whether the illumination of the subsurface location from a previous marine survey of the subsurface location is below the threshold. The actuation location engine 1289 can be configured to determine the plurality of actuation locations for a marine survey of the subsurface location yet to be performed.

In at least one embodiment, the obstruction determination engine 1288 can be configured to determine whether the illumination of the subsurface location is below the threshold during a marine survey of the subsurface location. The actuation location engine 1289 can be configured to determine the plurality of actuation locations during the marine survey.

In at least one embodiment, the obstruction determination engine 1288 can be configured to, for each respective one of the plurality of possible actuation locations, estimate an illumination of the subsurface location based on a priori data of the subsurface location. The obstruction determination engine 1288 can be configured to determine whether the estimated illumination of each respective one of the plurality of possible actuation locations is at least the threshold. The actuation location engine 1289 can be configured to responsive to a determination that the estimated illumination of a respective one of the plurality of possible actuation locations being at least the threshold, include the respective one of the plurality of possible actuation locations in the plurality of actuation locations.

Figure 13:
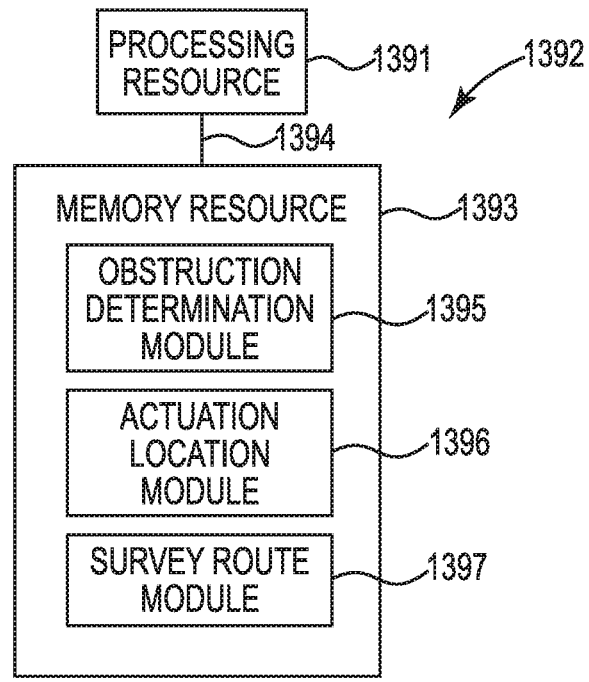
FIG. 13 illustrates an exemplary embodiment of a machine for marine surveying using a source vessel.

FIG. 13 illustrates an exemplary embodiment of a machine 1392 for marine surveying using a source vessel. The machine 1392 can utilize software, hardware, firmware, and/or logic to perform a number of functions. The machine 1392 can be a combination of hardware and program instructions configured to perform a number of functions and/or actions. The hardware, for example, can include a number of processing resources 1391 and a number of memory resources 1393, such as a machine-readable medium or other non-transitory memory resources 1393. The memory resources 1393 can be internal and/or external to the machine 1392, for example, the machine 1392 can include internal memory resources and have access to external memory resources. The program instructions, such as machine-readable instructions, can include instructions stored on the machine-readable medium to implement a particular function. The set of machine-readable instructions can be executable by at least one of the processing resources 1391. The memory resources 1393 can be coupled to the machine 1392 in a wired and/or wireless manner. For example, the memory resources 1393 can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

The memory resources 1393 can be non-transitory and can include volatile and/or non-volatile memory. Volatile memory can include memory that depends upon power to store data, such as various types of dynamic random-access memory among others. Non-volatile memory can include memory that does not depend upon power to store data. Examples of non-volatile memory can include solid state media such as flash memory, electrically erasable programmable read-only memory, phase change random access memory, magnetic memory, optical memory, and/or a solid-state drive, etc., as well as other types of non-transitory machine-readable media.

The processing resources 1391 can be coupled to the memory resources 1393 via a communication path 1394. The communication path 1394 can be local or remote to the machine 1392. Examples of a local communication path 1394 can include an electronic bus internal to a machine, where the memory resources 1393 are in communication with the processing resources 1391 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 1394 can be such that the memory resources 1393 are remote from the processing resources 1391, such as in a network connection between the memory resources 1393 and the processing resources 1391. That is, the communication path 1394 can be a network connection. Examples of such a network connection can include a local area network, wide area network, personal area network, and the Internet, among others.

As shown in FIG. 13, the machine-readable instructions stored in the memory resource 1393 can be segmented into a number of modules, such as an obstruction determination module 1395, an actuation location 1396, and a survey route module 1397, that when executed by the processing resource 1391 can perform a number of functions. As used herein, a module includes a set of instructions included to perform a particular task or action. The number of modules can be sub-modules of other modules. Furthermore, the number of modules can comprise individual modules separate and distinct from one another. Examples are not limited to the specific modules 1394, 1395, and 1396 illustrated by FIG. 13.

Each of the number of modules can include program instructions and/or a combination of hardware and program instructions that, when executed by the processing resources 1391, can function as a corresponding engine as described with respect to FIG. 12. For example, the obstruction determination module 1395 can include program instructions and/or a combination of hardware and program instructions that, when executed by the processing resources 1391, can function as the obstruction determination engine 1288. The actuation location module 1396 can include program instructions and/or a combination of hardware and program instructions that, when executed by the processing resources 1391, can function as the actuation location engine 1289. The survey route module 1397 can include program instructions and/or a combination of hardware and program instructions that, when executed by the processing resources 1391, can function as the survey route engine 1290.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    while a marine seismic survey is in progress, determining based on data collected from a receiver during the survey that illumination of a subsurface location is below a threshold;
    responsive to determining that the illumination of the subsurface location is below the threshold, determining, for a first source coupled to a first marine survey vessel, an actuation location relative to a position of a second marine survey vessel to enhance illumination of the subsurface location based on a survey route of the second marine survey vessel and a priori data of the subsurface location, wherein the second marine survey vessel is towing the receiver; and
    navigating the first marine survey vessel along a survey route of the first marine survey vessel to the actuation location during a marine survey by changing at least a cross-line position or an in-line position of the first marine survey vessel relative to the survey route of the second marine survey vessel;
    wherein determining the actuation location is based on determining expected amplitude responses associated with multiple pairs of possible actuation locations and receiver locations, and selecting one pair that provides a greatest expected amplitude response among the multiple pairs.

2. The method of claim 1, wherein navigating the first marine survey vessel to the actuation location comprises changing a bottom speed of the first marine survey vessel relative to a bottom speed of the second marine survey vessel.

3. The method of claim 1, further comprising:
    performing a first portion of a marine survey using a second source not coupled to the first marine survey vessel and not using the first source; and
    performing a second portion of the marine survey using the first and second sources.

4. The method of claim 3, further comprising:
    during the first portion of the marine survey, maintaining an approximate constant distance between the first marine survey vessel and the second marine survey vessel; and
    during the second portion of the marine survey, navigating the first marine survey vessel to the actuation location.

5. The method of claim 1, wherein:
    determining the actuation location comprises selecting an actuation location on an opposite side of a subsurface obstruction relative to a location of the receiver.

6. The method of claim 1, further comprising:
    determining a plurality of subsurface locations having illuminations below a threshold;
    determining a plurality of actuation locations, including the actuation location, for actuations of the first source relative to the position of the second marine survey vessel to enhance illumination of each of the plurality of subsurface locations based on the survey route of the second marine survey vessel and the a priori data of the plurality of subsurface locations; and
    determining the survey route of the first marine survey vessel comprising the plurality of actuation locations.

7. The method of claim 1, wherein determining the actuation location comprises at least one of:
    using raytracing;
    using a wave equation; and
    using a full waveform model.

8. The method of claim 1, further comprising adjusting a position of a second source coupled to the second marine survey vessel relative to the second marine survey vessel in an in-line direction or a cross-line direction to further enhance illumination of the subsurface location.

9. The method of claim 1, further comprising, during the marine survey, reinterpreting a geology of the subsurface location by supplementing the a priori data with marine survey data acquired from the marine survey.

10. The method of claim 9, wherein reinterpreting the geology of the subsurface location comprises updating a velocity model associated with the subsurface location using the marine survey data acquired from the marine survey.

11. A method, comprising:
    during a first portion of a marine survey:
        actuating a first source coupled to a first marine survey vessel to perform the marine survey;
        determining a subsurface location having an illumination below a threshold; and
        determining an actuation location to enhance illumination of the subsurface location based on a priori data of the subsurface location; and
    during a second portion of the marine survey:
        activating a second marine survey vessel from a standby mode in response to determining the subsurface location having the illumination below the threshold;
        navigating the second marine survey vessel to the actuation location;
        actuating a second source coupled to the second marine survey vessel at the actuation location; and
        deactivating the second marine vessel from the standby mode after actuating the second source at the actuation location;
    wherein the standby mode comprises a mode selected from a group comprising:
        the second marine survey vessel maintaining a fixed position relative to the first marine survey vessel;
        the second marine survey vessel maintaining a stationary position; and
        the second marine survey vessel moving at a reduced bottom speed relative to an activated bottom speed of the second marine survey vessel.

12. A non-transitory machine-readable medium storing a set of instructions executable by a processing resource to:
    while a marine seismic survey is in progress and responsive to data collected from receivers during the survey, determine whether an illumination of a subsurface location is below a threshold;
    responsive to a determination that the illumination is below the threshold, determine a plurality of actuation locations for actuation of a source towed by a first marine survey vessel relative to a survey route of a second marine survey vessel towing a receiver,
    wherein the plurality of actuation locations are determined from a plurality of possible actuation locations based on the survey route of the second marine survey vessel and based on expected amplitude responses associated the possible actuation locations; and
    actuate the source at one or more of the plurality of actuation locations.

13. The medium of claim 12:
    further comprising instructions executable to, for each respective one of the plurality of possible actuation locations, estimate an illumination of the subsurface location based on a priori data of the subsurface location, and wherein the instructions executable to determine the plurality of actuation locations comprise instructions executable to:

determine whether the estimated illumination of each respective one of the plurality of possible actuation locations is at least the threshold; and responsive to a determination that the estimated illumination of a respective one of the plurality of possible actuation locations being at least the threshold, include the respective one of the plurality of possible actuation locations in the plurality of actuation locations.

14. A system, comprising:

a first marine survey vessel configured to tow and actuate a source;

a second marine survey vessel configured to tow a receiver;

a third marine survey vessel configured to tow and actuate a different source; and a computing system in communication with the receiver, the computing system including a processing resource and a memory resource, wherein the computing system is configured to, during a marine survey:

receive marine survey data from the second marine survey vessel indicating an illumination of a subsurface;

determine an obstructed portion of the subsurface based on the indicated illumination;

determine an actuation location to further illuminate the obstructed portion of the subsurface; and determine a survey route of the first marine survey vessel along the actuation location determine a different actuation location that is not along the survey route of the first marine survey vessel to further illuminate the obstructed portion of the subsurface; and determine a survey route of the third marine survey vessel along the different actuation location;

wherein the third marine survey vessel is configured to change a position and a bottom speed of the third marine survey vessel relative to the position and the bottom speed of the second marine survey vessel according to the survey route of the third marine survey vessel.

15. The system of claim 14, wherein the first marine survey vessel is configured to change a position and a bottom speed of the first marine survey vessel, relative to a position and a bottom speed of the second marine survey vessel, according to the survey route of the first marine survey vessel.

16. The system of claim 14, wherein the first marine survey vessel is an autonomous vessel configured to:

autonomously navigate the survey route of the first marine survey vessel; and autonomously actuate the source at the actuation location along the survey route of the first marine survey vessel.

17. The system of claim 14, wherein the computing system is onboard the first or second marine survey vessel.

18. A system, comprising:

a first marine survey vessel configured to tow and actuate a source;

a second marine survey vessel configured to tow a receiver; and a computing system in communication with the receiver, the computing system including a processing resource and a memory resource, wherein the computing system is configured to, during a marine survey:

receive marine survey data from the second marine survey vessel indicating an illumination of a subsurface;

determine an obstructed portion of the subsurface based on the indicated illumination;

determine an actuation location to further illuminate the obstructed portion of the subsurface;

determine a survey route of the first marine survey vessel along the actuation location;

determine a different obstructed portion of the subsurface based on the indicated illumination;

determine a different actuation location to further illuminate the different obstructed portion of the subsurface;

dynamically update the survey route of the first marine survey vessel during the marine survey with the different actuation location as the different obstructed portion of the subsurface is determined; and wherein the first marine survey vessel is configured to dynamically change the position and the bottom speed of the first marine survey vessel relative to the position and the bottom speed of the second marine survey vessel according to the updated survey route of the first marine survey vessel.

* * * * *